(12) United States Patent
Ishikawa

(10) Patent No.: US 7,620,837 B2
(45) Date of Patent: Nov. 17, 2009

(54) DATA TRANSMISSION SYSTEM AND DATA TRANSMISSION APPARATUS

(75) Inventor: Toru Ishikawa, Kanagawa (JP)

(73) Assignee: Elpida Memory, Inc., Tokyo (JP)

( * ) Notice: Subject to any disclaimer, the term of this patent is extended or adjusted under 35 U.S.C. 154(b) by 294 days.

(21) Appl. No.: 11/890,438

(22) Filed: Aug. 6, 2007

(65) Prior Publication Data

US 2007/0300097 A1    Dec. 27, 2007

Related U.S. Application Data

(62) Division of application No. 10/062,907, filed on Jan. 31, 2002, now Pat. No. 7,272,738.

(30) Foreign Application Priority Data

Feb. 2, 2001 (JP) ............................. 2001-027467

(51) Int. Cl.
*G06F 1/12* (2006.01)
(52) U.S. Cl. ........................ 713/400; 713/503; 709/208; 709/253
(58) Field of Classification Search ................. 713/400, 713/503; 709/208, 253
See application file for complete search history.

(56) References Cited

U.S. PATENT DOCUMENTS

| | | | | |
|---|---|---|---|---|
| 5,864,592 A | * | 1/1999 | Itri | ............................... 375/375 |
| 6,078,623 A | * | 6/2000 | Isobe et al. | .................. 375/259 |
| 6,329,858 B1 | * | 12/2001 | Sobue | ......................... 327/231 |
| 6,385,263 B1 | * | 5/2002 | Bowers et al. | ............... 375/356 |
| 6,839,393 B1 | * | 1/2005 | Sidiropoulos | ................ 375/371 |
| 2002/0020852 A1 | * | 2/2002 | Huang | ........................ 257/197 |
| 2002/0116468 A1 | | 8/2002 | Ishikawa | |

OTHER PUBLICATIONS

U.S. Appl. No. 10/062,907, filed Aug. 22, 2002, Ishikawa, Toru.

* cited by examiner

*Primary Examiner*—Thomas Lee
*Assistant Examiner*—Vincent T Tran
(74) *Attorney, Agent, or Firm*—Darryl G. Walker

(57) ABSTRACT

A data transmission system including a slave device (30) and a master device (10) is disclosed. Slave device (30) may include a slave side clock signal generator section (32) for generating a slave side clock signal (CLKSOUT), a phase adjusting circuit (40) for controlling a phase of a slave side clock signal (CLKSOUT), output sections (33-1 to 33-m) for outputting transmission data signals (SD1 to SDm) in response to slave side clock signal (CLKSOUT), and a timing reference signal generator section (34) for outputting a timing reference signal (SSPH) in response to slave side clock signal (CLKSOUT). Master device (10) may include a master side clock signal generator section (11) for generating master side clock signal (CLKM), input sections (12-1 to 12-m) for sampling data signals (SD1 to SDm) in response to master side clock signal (CLKM), and a phase compare circuit (19) for generating a phase adjustment instruction signal (SADJOUT) based upon timing reference signal (SSPH) and master side clock signal (CLKM). Phase adjusting circuit (40) may adjust a phase of slave side clock signal (CLKSOUT) in response to phase adjustment instruction signal (SADJOUT). In this way, data setup and/or hold times may be improved.

5 Claims, 11 Drawing Sheets

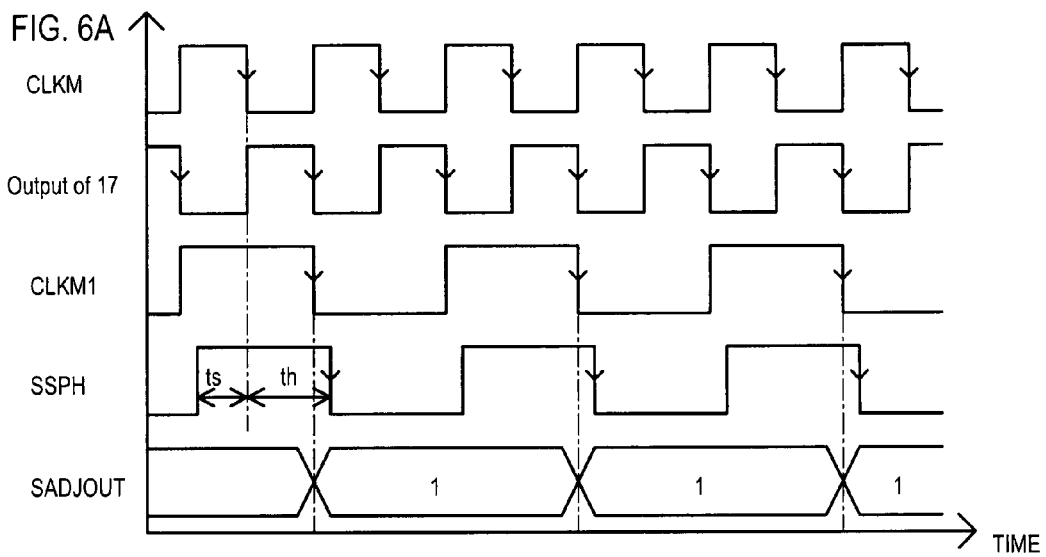
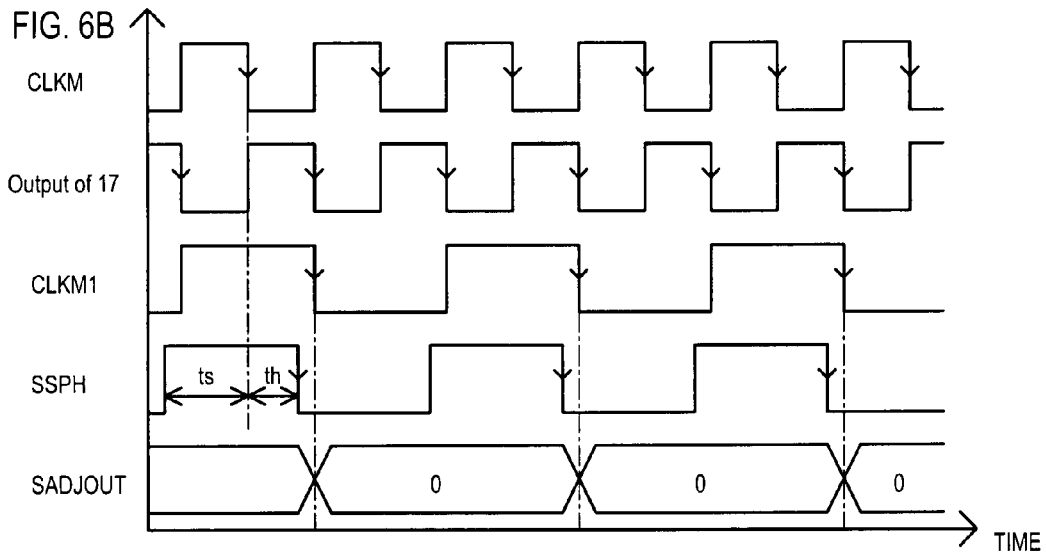
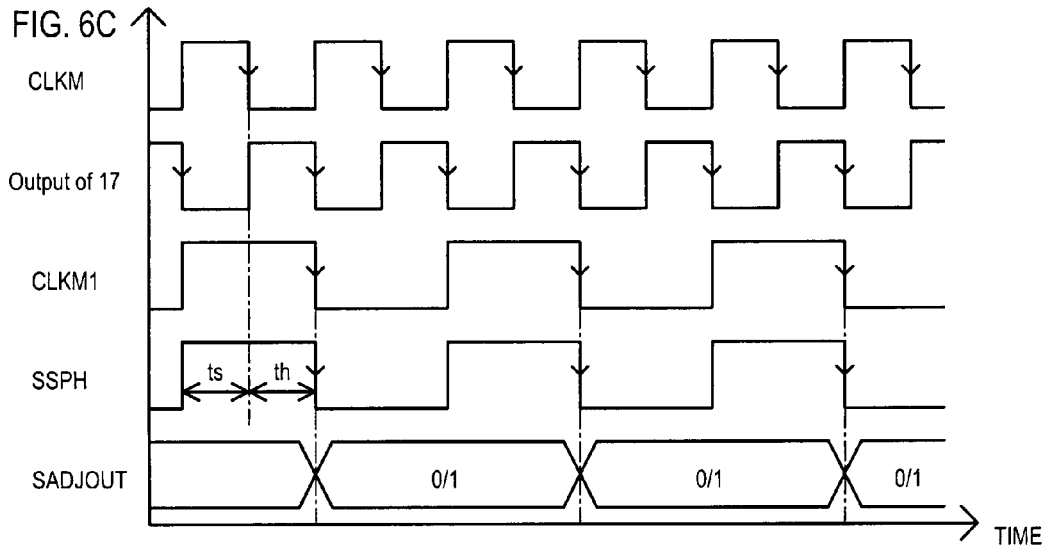

DATA TRANSMISSION SYSTEM AND DATA TRANSMISSION APPARATUS

This application is a divisional of patent application Ser. No. 10/062,907 filed Jan. 31, 2002.

TECHNICAL FIELD

The present invention relates generally to a data transmission system and more specifically to a data transmission system for transferring data among a plurality of devices through data buses.

BACKGROUND OF THE INVENTION

In a system, data transmission among a plurality of devices is achieved through data buses. It is important to provide adequate data setup time and hold time margins for sampling data when transferring data at high speeds.

Japanese Laid-Open Patent Publication No. Hei 11-85667 discloses a high speed bus system designed to provide adequate data setup and hold times while allowing data to be transmitted at a high speed. Such a high speed bus system will now be described with reference to FIGS. 1 and 2.

Referring now to FIG. 1, a conventional high speed bus system is set forth in a block schematic diagram. The conventional high speed bus system includes a master device 501-1 and a slave device 501-2. Master device 501-1 and slave device 501-2 are connected to clock buses (521 and 522) and data bus 523. Resistors (524 and 525) are respectively connected to an end of clock lines (521 and 522). A reference voltage 527 is connected to an end of data bus 523 through resistor 526. Clock signal tclkM is provided on clock bus 521 from master device 501-1 to slave device 501-2. Clock signal tclkS is provided on clock bus 522 from slave device 501-2 to master device 501-1. Data Data is provided on data bus 523 between master device 501-1 and slave device 501-2.

Referring now to FIG. 2, slave device 501-2 is set forth in a block schematic diagram. Slave device 501-2 includes a reception edge generator 502, data sampler 503, a transmission clock generator circuit 504, and a data output circuit 505. Reception edge generator circuit 502 converts a clock signal tclkM received on clock bus 521 to an internal clock signal RclkB. Internal clock signal RclkB is provided to data sampler 503. Data sampler 503 samples data Data in the same cycle as clock signal tclkM and in synchronism with a clock edge of internal clock signal RclkB.

The conventional high speed bus system provides data transmission between master device 501-1 ad slave device 501-2 as described below.

When data Data is transmitted from master device 501-1 to slave device 501-2, slave device 501-2 outputs clock signal tclkS to master device 501-1 through clock line 522. Slave device 501-2 outputs data Data to data line 522 in synchronism with clock signal tclkS. Master device 501-1 samples data Data based on clock signal tclkS.

In the conventional high speed bus system operating as described above, the device (master device 501-1 or slave device 501-2) providing the data transmission also provides a clock signal (tclkM or tclkS). The provided clock signal (tclkM or tclkS) is used by the device (slave device 501-2 or master device 501-2) that is receiving the transmitted data Data. In this way, an adequate data setup time and hold time is provided and data may be transferred at a high speed.

However, in a conventional high speed bus system having a plurality of slave devices 501-2, slave devices 501-2 may have varying characteristics which can lead to a reduced data setup time and/or hold time. For example, in a conventional high speed bus system having a plurality of slave devices 501-2 and data Data is transferred from master device 501-1 to slave device 501-2, reception edge generator circuit 502 within slave device 501-2 converts clock signal tclkM to internal clock signal RclkB. Internal clock signal RclkB is then used by data sampler 503 to sample data Data. However, in the plurality of slave devices 501-2, characteristics of reception edge generator circuit 502 may vary. Thus, the timing of sampling data Data among the plurality of slave devices 501-2 may also vary. Depending on the amount of variations, an adequate data setup time and/or hold time may only be provided in some of the plurality of slave devices 501-2 and data may not be transferred high speeds.

Also, in the conventional high speed bus system, characteristics of master device 501-1 and slave device 501-2 may vary due to changes in operating conditions, such as operating temperature and power supply voltage. Reduced margins of data setup time and/or hold time may result from such variations in characteristics. For example, when data Data is transferred from master device 501-2 to slave device 501-2 and the characteristics of reception edge generator circuit 502 are varied due to a change in the operating conditions, a rise time and/or a fall time of internal clock signal RclkB generated by reception edge generator circuit 502 may also vary. Reduced margins of data setup time and/or hold time during sampling of data Data may result from such variations in a rise time and/or a fall time of internal clock signal RclkB.

In light of the above discussion, it would be desirable to provide a data transmission system in which margins of a data setup time and/or hold time may be adequate when data is transferred between a master device and slave device. It would also be desirable to provide a data transmission system for transferring data between a master device and a slave device in which margins of a data setup time and/or hold time may not be reduced due to variations of characteristics of the slave device. It would also be desirable to provide a data transmission system for transferring data between a master device and slave device where margins of a data setup time and/or a data hold time may not be reduced due to a change in operating conditions.

SUMMARY OF THE INVENTION

A data transmission system may include a slave device and a master device. Slave device may include a slave side clock signal generator section for generating a slave side clock signal, a phase adjusting circuit for controlling a phase of a slave side clock signal, output sections for outputting transmission data signals in response to slave side clock signal, and a timing reference signal generator section for outputting a timing reference signal in response to slave side clock signal. Master device may include a master side clock signal generator section for generating master side clock signal, input sections for sampling data signals in response to master side clock signal, and a phase compare circuit for generating a phase adjustment instruction signal based upon timing reference signal and master side clock signal. Phase adjusting circuit may adjust a phase of slave side clock signal in response to phase adjustment instruction signal. In this way, data setup and/or hold times may be improved.

According to one aspect of the embodiments, a data transmission system may include a slave device and a master device. A slave device may include a slave side clock signal generator section coupled to generate a slave side clock signal. A phase adjusting circuit may be coupled to control a phase of the slave side clock signal. A slave output section may be coupled to output a transmission data signal to a first bus line in response to the slave side clock signal. A timing reference signal generating section may be coupled to output a timing reference signal to a second bus line in response to the slave side clock signal. A master device may include a master side clock signal generation section coupled to generate a master side clock signal. A master input section may be coupled to sample a first data signal transmitted through the first bus line. A phase compare circuit may be coupled to generate a phase adjustment instruction signal on the basis of the timing reference signal transmitted through the second bus line and the master side clock signal. The phase adjusting circuit may be coupled to receive the phase adjustment instruction signal through a third bus to adjust the phase of the slave side clock signal.

According to another aspect of the embodiments, the first bus line and the second bus line may have substantially the same length.

According to another aspect of the embodiments, the timing reference signal generator section may be coupled to sample the phase adjusting data in response to the slave side clock signal to generate the timing reference signal.

According to another aspect of the embodiments, the timing reference signal generator section may have substantially the same circuit construction as the slave output section.

According to another aspect of the embodiments, the master device may include a phase shift circuit coupled to receive the master side clock signal and provide a shifted master side clock signal coupled to be received by the phase compare circuit.

According to another aspect of the embodiments, the slave device may include a phase adjusting data generator section coupled to generate the phase adjusting data in response to the slave side clock signal such that different values may be alternatively repeated every n cycles of the slave side clock signal. The master device may include a control circuit coupled to provide n, where n may be a natural number.

According to another aspect of the embodiments, the control circuit may define an initial value ($n^{INI}$, where $n^{INI}$ is a natural number of 2 or more) for n in a first period, and a standard value ($n^{STD}$, where $n^{STD}$ is a natural number) for n in a second period after the first period.

According to another aspect of the embodiments, the first period may be initiated from a transmission system initialization.

According to another aspect of the embodiments, the transmission system may include a plurality of slave devices. Each slave device may include a slave side clock signal generator section coupled to generate a slave side clock signal. A phase adjusting circuit may be coupled to control a phase of the slave side clock signal. A slave output section may be coupled to output a transmission data signal to a first bus line in response to the slave side clock signal. A timing reference signal generating section may be coupled to output a timing reference signal to a second bus line in response to the slave side clock signal. The phase adjusting circuit in each of the plurality of slave devices may be coupled to receive the phase adjustment instruction signal through the third bus to adjust the phase of the slave side clock signal.

According to another aspect of the embodiments, the plurality of slave devices may have the phase of the slave side clock signal adjusted at different times.

According to another aspect of the embodiments, each of the plurality of slave devices may include a phase adjusting data generator section coupled to generate the phase adjusting data in response to the slave side clock signal such that different values may be alternatively repeated every m cycles of the slave side clock signal. The master device may include a control circuit for providing m, where m is a natural number.

According to another aspect of the embodiments, the master device may include a phase shift circuit coupled to receive the master side clock signal and may provide a shifted master side clock signal coupled to be received by the phase compare circuit.

According to another aspect of the embodiments, a data transmission system may include a slave device and a master device. A slave device may include a slave side clock signal generator section coupled to generate a slave side clock signal. A phase adjusting circuit may be coupled to control a phase of the slave side clock signal. A data switching circuit may be coupled to select a transmission data or a phase adjusting data for outputting as a select data. A slave output section may be coupled to receive the select data and output a transmission data signal to a first bus line in response to the slave side clock signal. A master device may include a master side clock signal generation section coupled to generate a master side clock signal. A phase shift circuit may be coupled to receive the master side clock signal and may provide a shifted master side clock signal. A clock signal switching circuit may be coupled to select the shifted master side clock signal or the master side clock signal for outputting as a select clock signal. A master input section may be coupled to sample the transmission data signal transmitted through the first bus line in response to the select clock signal. When the phase adjusting data is selected as the select data, the shifted master side clock signal may be selected as the select clock signal and the master input section may output a phase adjustment instruction signal based upon the select clock signal and the transmission data signal. The phase adjusting circuit may adjust the phase of the slave side clock signal based upon the phase adjustment instruction signal coupled to be transmitted through a second bus line.

According to another aspect of the embodiments, a clock bus may be coupled to supply a clock signal to the slave side clock signal generator section and the master side clock signal generator.

According to another aspect of the embodiments, the data transmission system may include a plurality of slave devices. Each slave device may include a slave side clock signal generator section coupled to generate a slave side clock signal. A phase adjusting circuit may be coupled to control a phase of the slave side clock signal. A data switching circuit may be coupled to select a transmission data or a phase adjusting data for outputting as a select data. A slave output section may be coupled to receive the select data and output a transmission data signal to a first bus line in response to the slave side clock signal. When the phase adjusting data is selected as the select data, the shifted master side clock signal may be selected as the select clock signal and the master input section may output a phase adjustment instruction signal based upon the select clock signal and the transmission data signal. The phase adjusting circuit of at least one of the plurality of slave devices may adjust the phase of the slave side clock signal of the at least one of the plurality of slave devices based upon the phase adjustment instruction signal coupled to be transmitted through a second bus line.

According to another aspect of the embodiments, a master device for use in a data transmission system may include a master side clock signal generation section coupled to generate a master side clock signal. A phase shift circuit may be coupled to receive the master side clock signal and may provide a shifted master side clock signal. A first terminal may be coupled to receive a transmission data signal. A second terminal may be coupled to receive a timing reference signal. An input section may be coupled to sample the transmission data signal in response to the select clock signal. A phase compare circuit may be coupled to generate a phase adjustment instruction signal at a third terminal on the basis of the timing reference signal and the shifted clock signal.

According to another aspect of the embodiments, a slave device for use in a data transmission system may include a slave side clock signal generator section coupled to generate a slave side clock signal. A phase adjusting circuit may be coupled to control a phase of the slave side clock signal. A slave output section may be coupled to output a transmission data signal in response to the slave side clock signal. A timing reference signal generating section may be coupled to output a timing reference signal to a second terminal in response to the slave side clock signal. A third terminal may be coupled to receive a control signal and the phase adjusting circuit may adjust the phase of the slave side clock signal in response to the control signal.

According to another aspect of the embodiments, the timing reference signal generator section may be coupled to sample the phase adjusting data in response to the slave side clock signal to generate the timing reference signal.

According to another aspect of the embodiments, a phase adjusting data generator section may be coupled to generate the phase adjusting data in response to the slave side clock signal such that different values may be alternatively repeated every n cycles of the slave side clock signal, where n is a natural number.

According to another aspect of the embodiments, a data transmission system may include a slave device and a master device. A master device may include a master side clock signal generation section coupled to generate a master side clock signal. A master side output section may be coupled to output a transmission data signal in response to the master side clock signal. A timing reference signal generating section may be coupled to output a timing reference signal in response to the master side clock signal. A slave device may include a slave side clock signal generator section coupled to generate a slave side clock signal. A slave side input section may be coupled to sample the transmission data, transmitted through a first bus line, in response to the slave side clock signal. A phase compare circuit may be coupled to generate a phase adjustment instruction signal on the basis of the timing reference signal transmitted through a second bus line and the slave side clock signal. A phase adjusting circuit may be coupled to control a phase of the slave side clock signal. The phase adjusting circuit may adjust the phase of the slave side clock signal in response to the phase adjustment instruction signal.

According to another aspect of the embodiments, the timing reference signal generator section may include a phase shift circuit coupled to shift the master side clock signal by a predetermined time and output a shifted clock signal.

According to another aspect of the embodiments, the timing reference signal generator section may include a timing reference signal output section coupled to sample the phase adjusting data in response to the shifted clock signal and generate the timing reference signal.

According to another aspect of the embodiments, the master device may include a phase adjusting data generator section. The phase adjusting data generator section may be coupled to generate the phase adjusting data in response to the shifted clock signal such that different values may be alternatively repeated every n cycles of the slave side clock signal, where n is a natural number. A control circuit may be coupled to provide n.

According to another aspect of the embodiments, the control circuit may define an initial value ($n^{INI}$, where $n^{INI}$ is a natural number of 2 or more) for n in a first period, and may define a standard value ($n^{STD}$, where $n^{STD}$ is a natural number) for n in a second period after the first period.

According to another aspect of the embodiments, the first period may be initiated from a transmission system initialization.

According to another aspect of the embodiments, the timing reference output section may have substantially the same circuit construction as the master side output section.

According to another aspect of the embodiments, the first bus line and the second bus line may have substantially the same length.

According to another aspect of the embodiments, the data transmission may include a plurality of slave devices. Each slave device may include a slave side clock signal generator section coupled to generate a slave side clock signal. A slave side input section may be coupled to sample the transmission data, transmitted through a first bus line, in response to the slave side clock signal. A phase compare circuit may be coupled to generate a phase adjustment instruction signal on the basis of the timing reference signal transmitted through a second bus line and the slave side clock signal. A phase adjusting circuit may be coupled to control a phase of the slave side clock signal. The phase adjusting circuit may adjust the phase of the slave side clock signal in response to the phase adjustment instruction signal. The phase compare circuit in each of the plurality of slave devices may be coupled to generate the phase adjustment instruction signal in response to the timing reference signal received through the second bus line in a time division manner and the phase adjusting circuit may adjust the phase of the slave side clock signal in response to the phase adjustment instruction signal.

According to another aspect of the embodiments, a data transmission device may include a master device and a slave device. A master device may include a master side clock signal generation section coupled to generate a master side clock signal. A phase shift circuit may be coupled to receive the master side clock signal and provide a shifted master side clock signal. A clock signal switching circuit may be coupled to select the shifted master side clock signal or the master side clock signal for outputting as a select clock signal. A data switching circuit may be coupled to select a transmission data or phase adjusting data for outputting as select data. A master side output section may be coupled to output a master side output signal, based on the select data, in response to the master side clock signal. A slave device may include a slave side clock signal generator section coupled to generate a slave side clock signal. A slave side input section may be coupled to sample the master side output signal, transmitted through a bus line, in response to the slave side clock signal. A phase adjusting circuit may be coupled to control a phase of the slave side clock signal. When the phase adjusting data is selected as the select data, the shifted clock signal may be selected as the select clock signal and the slave side input section may be coupled to generate a phase adjustment instruction signal based upon the master side output signal and the slave side clock signal. The phase adjusting circuit may adjust the phase of the slave side clock signal in response to the phase adjustment instruction signal.

According to another aspect of the embodiments, a clock bus may be coupled to supply a clock signal to the slave side clock signal generator section and the master side clock signal generator.

According to another aspect of the embodiments, a master device for use in a transmission system may include a master side clock signal generation section coupled to generate a master side clock signal. A phase shift circuit may be coupled to receive the master side clock signal and provide a shifted master side clock signal. A master side output section may be coupled to output a transmission data signal to a first terminal in response to the master side clock signal. A timing reference signal generating section may be coupled to output a timing reference signal to a second terminal in response to the shifted master side clock signal.

According to another aspect of the embodiments, the timing reference signal generating section may be coupled to sample a phase adjusting data in response to the shifted master side clock signal and output the timing reference signal.

According to another aspect of the embodiments, a phase adjusting data generator section may be coupled to generate the phase adjusting data in response to the shifted clock signal such that different values may be alternatively repeated every n cycles of the slave side clock signal, where n is a natural number. A control circuit may be coupled to provide n.

According to another aspect of the embodiments, a slave device for use in a data transmission system may include a slave side clock signal generator section coupled to generate a slave side clock signal. A first terminal may be coupled to receive a transmission data signal. A second terminal may be coupled to receive a timing reference signal that may be substantially in synchronism with the transmission data signal. A phase compare circuit may be coupled to generate a phase adjustment instruction signal on the basis of the timing reference signal and the slave side clock signal. A phase adjustment section may be coupled to control a phase of the slave side clock signal. The phase adjustment section may adjust the phase of the slave side clock signal in response to the phase adjustment instruction signal.

According to another aspect of the embodiments, a data transmission system may include a master device and a slave device. The slave device may be coupled to output a transmission data signal in synchronism with a slave side clock signal. A master device may be coupled to sample the transmission data signal at a master side sampling timing indicated by a master side clock signal. The slave device may adjust a phase of the slave side clock signal such that a data transition timing where the transmission data signal may change and the master side sampling timing may provide a predetermined timing difference.

According to another aspect of the embodiments, a data transmission system may include a master device and a slave device. The master device may be coupled to output a transmission data signal in a master side timing indicated by a master side clock signal. The slave device may be coupled to sample the transmission data signal at a slave side timing indicated by a slave side clock signal. The master device may be coupled to output a timing reference signal indicating an object timing displaced by a predetermined time difference from the master side timing. The slave device may adjust a phase of the slave side clock signal such that the object timing and the phase of the slave side clock signal may be substantially brought into coincidence.

According to another aspect of the embodiments, a data transmission method may include the steps of generating a slave side clock signal, sampling a transmission data at a slave side sampling timing in response to the slave side clock signal to generate a transmission data signal, generating a timing reference signal indicated by a transition data signal transition timing of the transmission data signal, generating a master side clock signal, sampling the transmission data signal at a master side sampling timing in response to the master side clock signal, generating a phase adjustment instruction signal based upon the timing reference signal and the master side clock signal, and adjusting a phase of the slave side clock signal based upon the phase adjustment instruction signal.

According to another aspect of the embodiments, a data transmission system may include the steps of generating a master side clock signal, sampling a transmission data at a master side sampling timing in response to the master side clock signal to generate a transmission data signal, generating a timing reference signal instructing an object timing based upon the master side clock signal, generating a slave side clock signal, sampling the transmission data signal at a slave side timing in response to the slave side clock signal, and adjusting a phase of the slave side clock signal based upon the timing reference signal such that the slave side sampling timing and the object time may be substantially brought into coincidence.

BRIEF DESCRIPTION OF THE DRAWINGS

FIGS. 6A, 6B, and 6C are timing diagrams illustrating a phase adjustment of a timing reference signal according to an embodiment.

DETAILED DESCRIPTION OF THE EMBODIMENTS

Various embodiments of the present invention will now be described in detail with reference to a number of drawings.

Figure 1:
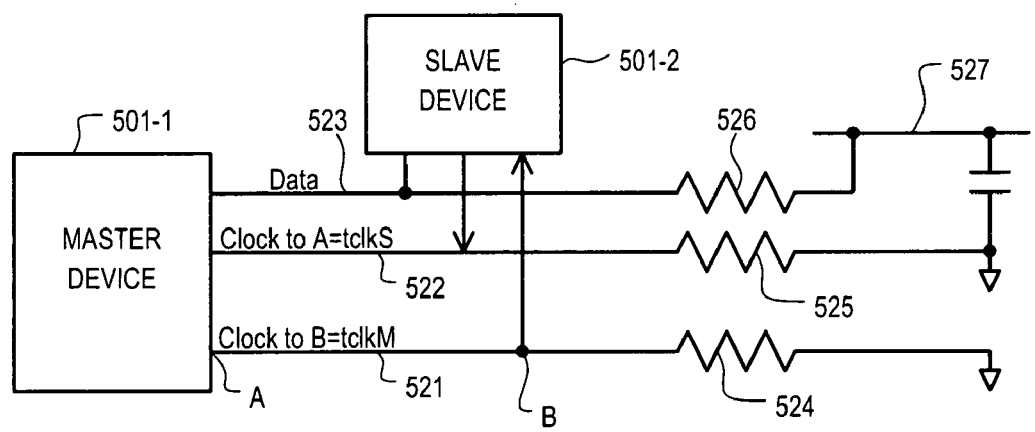
FIG. 1 is a block schematic diagram of a conventional high speed bus system.
Figure 2:
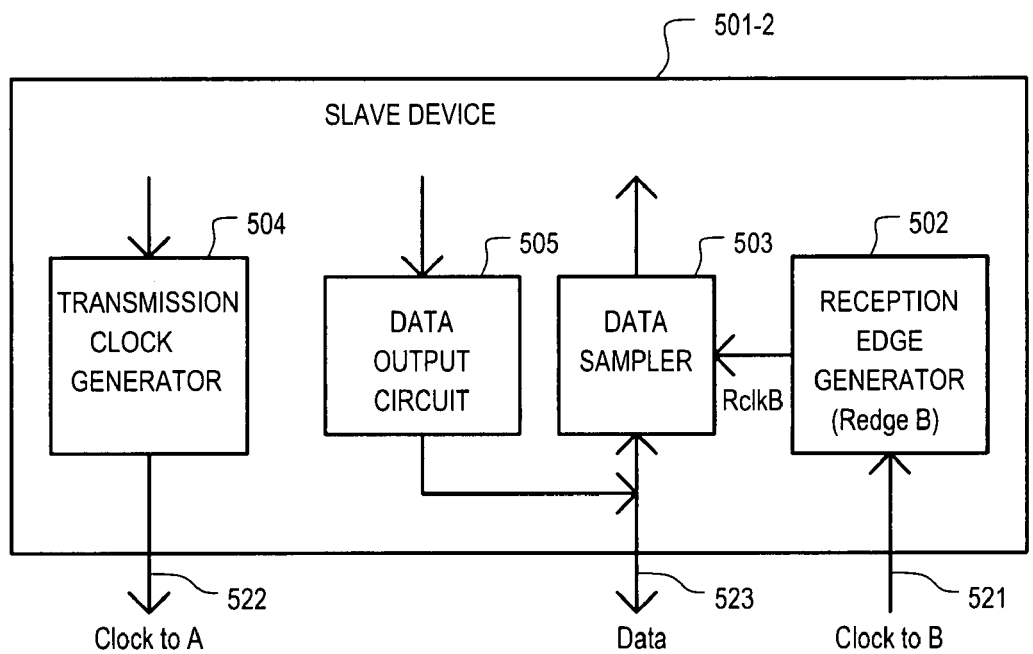
FIG. 2 is a block schematic diagram of a conventional slave device.
Figure 3:
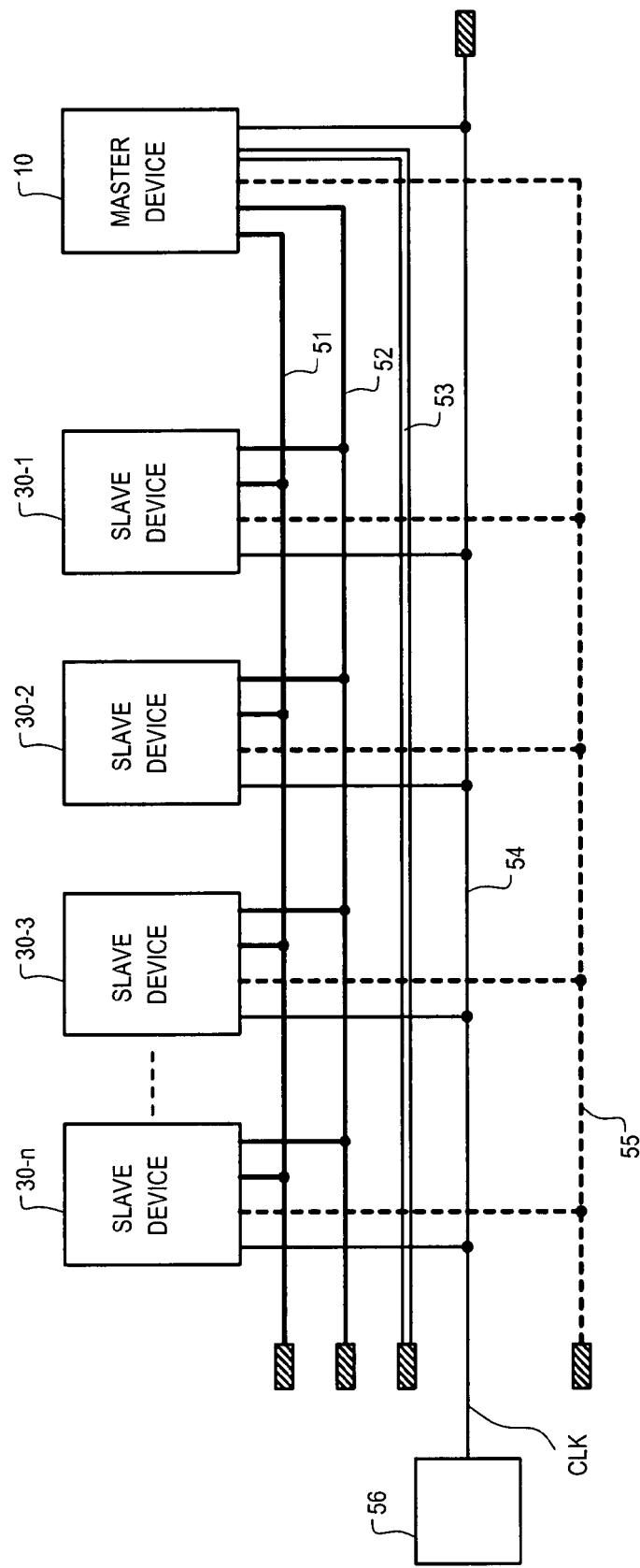
FIG. 3 is a block schematic diagram of a data transmission system according to a first embodiment.

Referring now to FIG. 3, a block schematic diagram of a data transmission system according to a first embodiment is set forth.

A data transmission system may include a master device 10 and n slave devices (30-1 to 30-n). Master device 10 and slave devices (30-1 to 30-n) may be connected with an input bus 51, an output bus 52, a register I/O bus 53, a clock line 54, and a timing reference signal transmission bus 55. A clock generator circuit 56 may be connected to provide a clock signal CLK to clock line 54.

Figure 4:
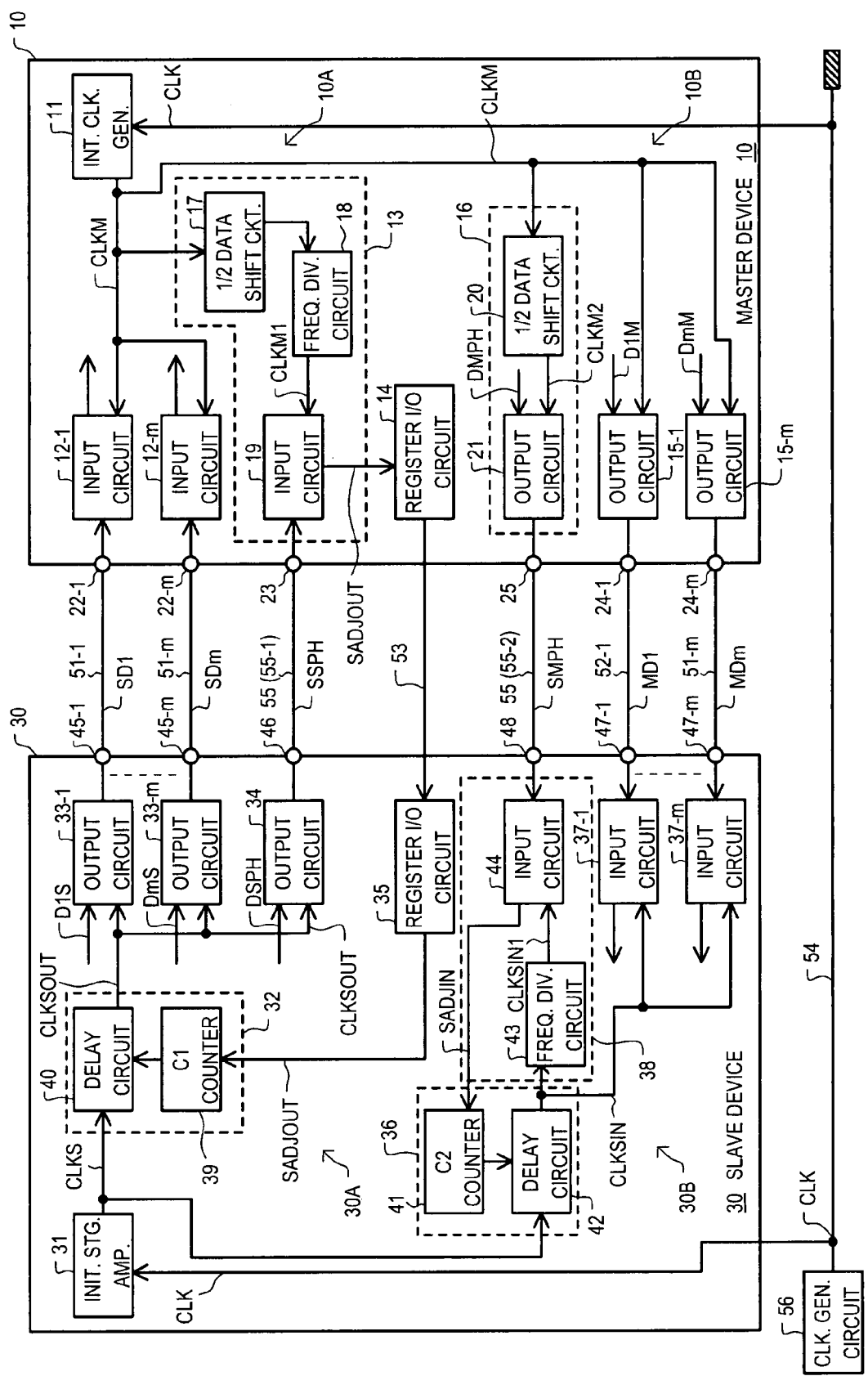
FIG. 4 is a block schematic diagram of a construction of a master device and a slave device according to an embodiment.

Referring now to FIG. 4, construction of a master device 10 and a slave device 30 according to an embodiment are set forth in a block schematic diagram. Master device 10 may correspond to master device 10 of FIG. 3. Slave device 30 may correspond to slave devices (30-1 to 30-n) of FIG. 3.

Master device 10 may include an internal clock generator circuit 11, m input circuits (12-1 to 12-m), a timing compare circuit 13, a register I/O circuit 14, m output circuits (15-1 to 15-m), and a timing reference signal generator circuit 16.

Timing compare circuit 13 may include a half data shift circuit 17, a frequency divider circuit 18, and a phase compare input circuit 19.

Timing reference generator circuit 16 may include a half data shift circuit 20 and a timing reference signal output circuit 21.

Internal clock generator circuit 11 may receive a clock signal CLK by way of a clock line 54. Internal clock generator circuit 11 may generate a master side clock signal CLKM based on clock signal CLK. Master side clock signal CLKM may have substantially the same frequency as clock signal CLK.

Input circuits (12-1 to 12-m), timing compare circuit 13, and register I/O circuit 14 may collectively form a master side input system 10A.

Output circuits (15-1 to 15-m) and timing reference signal generator circuit 16 may collectively form a circuit group where a process to output data to slave device 30 may be performed. Output circuits (15-1 to 15-m) and timing reference signal generator circuit 16 may collectively form a master side data output system 10B.

Slave device 30 may include an initial stage amplifier 31, a slave side output clock generator circuit 32, output circuits (33-1 to 33-m), a timing reference signal output circuit 34, a register I/O circuit 35, a slave side input clock generator circuit 36, m input circuits (37-1 to 37-m), and a timing compare circuit 38.

Slave side input clock generator circuit 36 may include a counter 41 and a delay circuit 42.

Timing compare circuit 38 may include a frequency division circuit 43 and a phase compare input circuit 44.

Initial stage amplifier 31 may be connected to receive clock signal CLK by way of clock line 54. Initial stage amplifier 31 may generate slave clock signal CLKS based on clock signal CLK. Slave side clock signal CLKS may have substantially the same frequency as clock signal CLK. In this way, slave side clock signal CLKS and master side clock signal CLKM may have substantially the same frequency.

Slave side output clock generator circuit 32, output circuits (33-1 to 33-m), timing reference signal output circuit 34 and register I/O circuit 35 may be included in a circuit group where a process to output data to master device 10 may be performed. Slave side output clock generator circuit 32, output circuits (33-1 to 33-m), timing reference signal output circuit 34 and register I/O circuit 35 may collectively form a slave side data output system 30A.

Slave side input clock generator circuit 36, input circuits (37-1 to 37-m), and timing compare circuit 38 may be included in a circuit group where a process to receive data output from master device 10 may be performed. Slave side input clock generator circuit 36, input circuits (37-1 to 37-m), and timing compare circuit 38 may collectively form a slave side data input system 30B.

Slave side data output system 30A and master side data input system 10A forming circuit groups associated with an operation of transmitting data from slave device 30 to master device 10 will now be described.

Slave side output clock generator circuit 32 of slave side data output system 30A may delay slave side clock signal CLKS and generate slave side clock signal CLKSOUT. Slave side output clock generator circuit 32 may include a counter 39 and a delay circuit 40. Counter 39 may store a counter value Cl. Delay circuit 40 may delay slave side clock signal CLKS by a delay time corresponding to counter value Cl stored by counter 39 to provide slave side clock signal CLKSOUT. A delay of delay circuit 40 may increase as counter value Cl becomes larger. Slave side clock signal CLKSOUT may be supplied to output circuits (33-1 to 33-m).

Output circuits (33-1 to 33-m) may respectively sample data (D1S to DmS) in synchronism with slave side clock signal CLKSOUT and may output data signals (SD1 to SDm). Data (D1S to DmS) may be transmitted from slave device 30 to master device 10 on input bus 51. Input bus 51 may include input bus lines (51-1 to 51-m). Data (D1S to DmS) may be binary and as such may each have a value of "0" or "1", as just one example. When output circuits (33-1 to 33-m) sample data (D1S to DmS) having a "0", such circuits may provide data signal (SD1 to SDm) at a low level. When output circuits (33-1 to 33-m) sample data (D1S to DmS) having a "1", such circuits may provide data signal (SD1 to SDm) at a high level. Data signals (SD1 to SDm) may be output in synchronism with a falling edge of slave side clock signal CLKSOUT and may be delayed by a propagation delay of Δt1 by output circuit (33-1 to 33-m).

When data (D1S to DmS) have a change in logic value between a "0" and a "1", output circuits (33-1 to 33-m) may change a logic value of output signals (SD1 to SDm) upon the receipt of the next falling edge of slave side clock signal CLKSOUT. In this way, output circuits (33-1 to 33-m) may have an output period of output signals (SD1 to SDm) that is a predetermined period corresponding to a time interval between consecutive falling edges of slave side clock signal CLKSOUT.

Output circuits (33-1 to 33-m) may output data signals (SD1 to SDm) to output terminal (45-1 to 45-m) respectively. Each output terminal (45-1 to 45-m) may be respectively connected to an input bus signal line (51-1 to 51-m). Collectively bus signal lines (51-1 to 51-m) may comprise input bus 51. Input bus signal lines (51-1 to 51-m) may transmit data signals (SD1 to SDm) to master device 10.

Master device 10 may include input terminals (22-1 to 22-m). Each input terminal (22-1 to 22-m) may be respectively connected to an input bus signal line (51-1 to 51-m) and may receive a respective data signal (SD1 to SDm).

Input terminals (22-1 to 22-m) may be respectively connected to input circuits (12-1 to 12-m) in master device 10. In this way, master device 10 may receive data signals (SD1 to SDm) from slave device 30. Input circuits (12-1 to 12-m) may sample data signals (SD1 to SDm) in accordance with a timing triggered by a falling edge of master side clock signal CLKM.

Master side clock signal CLKM and slave side clock signal CLKSOUT may be both generated on the basis of clock signal CLK and may have periods that can be coincident with each other. In this way, a sampling period where input circuits (12-1 to 12-m) sample data signals (SD1 to SDm) may be coincident with an output period of output circuits (33-1 to 33-m) providing data signals (SD1 to SDm). Having a sample period where input circuits (12-1 to 12-m) sample data signals (SD1 to SDm) that is coincident with an output period of output circuits (33-1 to 33-m) may be important to properly transmit data from slave device 30 to master device 10. The aforementioned sampling period where input circuits (12-1 to 12m) sample data signals (SD1 to SDm), i.e., essentially the output period of output circuits (33-1 to 33-m) may be expressed by period $T_{SM}$.

It may be desirable to provide sufficient margins to a setup time $t_s$ and hold time $t_h$ for data being properly transmitted from slave device 30 to master device 10 to enable input circuits (12-1 to 12-m) to properly sample data signals (SD1 to SDm) synchronously with master side clock signal CLKM. In the present data transmission system, a phase of slave side clock signal CLKSOUT may be adjusted as described below in order to provide proper margins of setup time $t_s$ and hold time $t_h$.

In slave device 10, slave side clock signal CLKSOUT may be supplied to a timing reference output circuit 34. Timing reference signal output circuit 34 may sample phase adjusting data DSPH to output timing reference signal SSPH. Timing reference signal output circuit 34 may use a falling edge of slave side clock signal CLKSOUT as a trigger for sampling phase adjusting data DSPH. Phase adjusting data DSPH may successively alternate between "0" and "1" in a repeated manner. In this way, timing reference signal SSPH generated by timing reference output circuit 34 may have a frequency that may be essentially one-half a frequency of slave side clock signal CLKSOUT. Timing reference signal SSPH may be provided to an output terminal 46. Output terminal 46 may be connected to timing reference signal transmission bus line 55-1. Timing reference signal transmission bus line 55-1 may be included in timing reference signal transmission bus 55. Timing reference signal transmission bus line 55-1 may be electrically connected to transmit timing reference signal SSPH to master device 10 at input terminal 23.

Timing reference signal output circuit 34 that generates timing reference signal SSPH may have substantially the same circuit construction as output circuits (33-1 to 33-m) that output data signals (SD1 to SDm). Also, timing reference signal transmission bus line 55-1 and input bus signal lines (51-1 to 51-m) may have substantially the same wiring length and substantially the same delay time.

In this way, timings of transitions of data signals (SD1 to SDM) at input terminals (22-1 to 22-m) and a transition of timing reference signal SSPH at input terminal 23 may be substantially coincident with each other.

Figure 5:
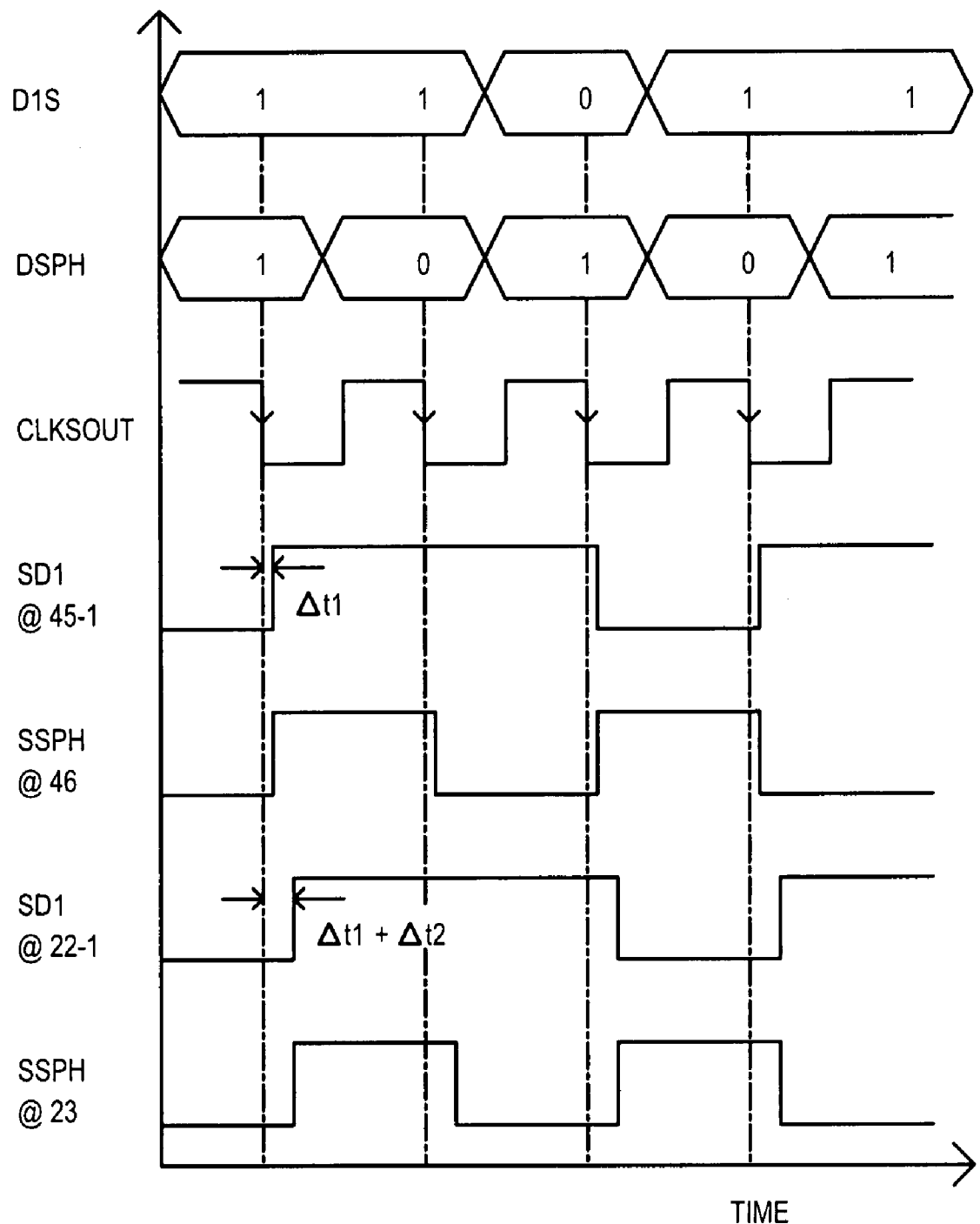
FIG. 5 is a timing diagram illustrating data transfer from a slave device to a master device according to an embodiment.

Referring now to FIG. 5, a timing diagram illustrating data transfer from a slave device to a master device according to an embodiment is set forth.

The timing diagram of FIG. 5 may include waveforms of data D1S, phase adjusting data DSPH, slave side clock signal CLKSOUT, data signal SD1 at output terminal 45-1, timing reference signal SSPH at output terminal 46, data signal SD1 at input terminal 22-1, and timing reference signal SSPH at input terminal 23.

In the timing diagram of FIG. 5, timing reference signal output circuit 34 and output circuits 33-1 to 33-m may have substantially the same construction and substantially the same delay time Δt1. Thus, data signal SD1 and timing reference signal SSPH may be essentially valid at output terminals (45-1 and 46) respectively after a delay time Δt1 after a falling edge of slave side clock signal CLKSOUT. Timing reference signal transmission bus line 55-1 and input bus signal line 51-1 may have substantially the same delay time Δt2. Therefore, data signal SD1 transmitted to input terminal 22-1 by input bus signal line 51-1 and timing reference signal SSPH transmitted to input terminal 23 through timing reference signal transmission bus line 55-1 may be received by master device 10 delayed by delay time (Δt1+Δt2) from the falling edge of slave side clock signal CLKSOUT. In this way, the timing in which a valid data signal SD1 and a transition of timing reference signal SSPH is received by master device may be substantially the same.

Referring once again to FIG. 4, timing compare circuit 13 may generate a phase adjustment instruction signal SADJOUT for providing an adjustment of the phase of slave side clock signal CLKSOUT on the basis of timing reference signal SSPH and master side clock signal CLKM. Phase adjustment instruction signal SADJOUT may be input into counter 39 of slave side output clock generator circuit 32 through register I/O circuit 14, register I/O bus 53, and register I/O circuit 35.

Counter 39 may adjust a counter value C1 held therein on the basis of phase adjustment instruction signal SADJOUT. When phase adjustment instruction signal SADJOUT is high, counter 39 may reduce counter value C1. When counter value C1 is reduced, a phase of slave side clock signal CLKSOUT may become more led. When phase adjustment instruction signal SADJOUT is low, counter 39 may increase counter value C1. When counter value C1 is increased, a phase of slave side clock signal CLKSOUT may be more delayed.

A phase of slave side clock CLKSOUT may be defined such that the timing of the falling edge of master side clock signal CLKM may be positioned essentially in a mid-point timing between transitions of timing reference signal SSPH. In this way, the timing in which input circuits (12-1 to 12-m) may sample data signals (SD1 to SDm) as defined by a falling edge of master side clock signal CLKM may be essentially at a mid-point timing between transitions of timing reference signal SSPH and data setup and/or hold timings may be maximized.

Timing compare circuit 13 may operate to generate phase adjustment instruction signal SADJOUT such that a timing of a falling edge of master side clock signal CLKM may be essentially at a midpoint timing of transitions in timing reference signal SSPH.

Timing compare circuit 13 may include a half data shift circuit 17, a frequency divider circuit 18, and a phase compare input circuit 19.

Half data shift circuit 17 may delay master side clock signal CLKM by essentially one half of a data sampling period Tsm. In this way, half data shift circuit 17 may serve to provide a timing difference between a timing of a falling edge of master side clock signal CLKM and an essentially mid-point timing between transitions of timing reference signal SSPH. Half data shift circuit 17 may delay master side clock signal CLKM by one half of data sampling period Tsm so that the above-mentioned timing difference may be essentially one half of data sampling period Tsm.

Frequency divider circuit 18 may provide a frequency division of delayed master side clock signal CLKM to generate frequency division clock signal CLKM1. Frequency division clock signal CLKM1 may have a frequency that can be essentially one half a frequency of master side clock signal CLKM. Frequency division clock signal CLKM1 may be generated at essentially a mid point between falling edge transitions of side clock signal CLKM. This timing relation may be illustrated in FIGS. 6A, 6B, and 6C.

FIGS. 6A, 6B, and 6C are timing diagrams illustrating a phase adjustment of a timing reference signal. FIG. 6A may illustrate a case where a timing reference signal SSPH has a phase that may be lagging with respect to a desired phase. FIG. 6B may illustrate a case where a timing reference signal SSPH has a phase that may be leading with respect to a desired phase. FIG. 6C may illustrate a case where a timing reference signal SSPH has a phase that may be essentially at a desired phase.

Referring now to FIG. 4 in conjunction with FIGS. 6A, 6B, and 6C, phase compare input circuit 19 may sample timing reference signal SSPH at a falling edge of frequency division clock signal CLKM1 and may generate phase adjustment instruction signal SADJOUT. If frequency division clock signal CLKM1 has a falling edge when timing reference signal SSPH is at a high level as illustrated in FIG. 6A, phase compare input circuit 19 may provide a phase adjustment instruction signal SADJOUT having a high level ("1"). If frequency division clock signal CLKM1 has a falling edge when timing reference signal SSPH is at a low level as illustrated in FIG. 6B, phase compare input circuit 19 may provide a phase adjustment instruction signal SADJOUT having a low level ("0"). In this way, phase adjustment instruction signal SADJOUT may take a high or low level depending an essentially midpoint timing of transitions in timing reference signal SSPH at a falling edge of master side clock signal CLKM.

Referring to FIG. 6A, when an essentially midpoint timing of transitions in timing reference signal SSPH is late or lags in time with respect to a falling edge of master clock signal CLKM, it may be necessary to advance a phase of slave side clock signal CLKSOUT. In this case, the data setup time ts of data signal (SD1 to SDm) with respect to master side clock signal CLKM may be shorter than a hold time Th. Phase compare input circuit 19 may then output a phase adjustment instruction signal SADJOUT having a high level. Counter 39 may reduce a counter value C1 in response to phase adjustment instruction signal SADJOUT having a high level. When counter value C1 is reduced, a delay time of delay circuit 40 may be shortened. With a delay time of delay circuit 40 shortened, a phase of slave side clock signal CLKSOUT may be led or moved in.

In contrast, referring to FIG. 6B, when an essentially midpoint timing of transitions in timing reference signal SSPH is early or leads in time with respect to a falling edge of master clock signal CLKM, it may be necessary to delay a phase of slave side clock signal CLKSOUT. In this case, the data setup time ts of data signal (SD1 to SDm) with respect to master side clock signal CLKM may be greater than a hold time Th. Phase compare input circuit 19 may then output a phase adjustment instruction signal SADJOUT having a low level. Counter 39 may increase a counter value C1 in response to phase adjustment instruction signal SADJOUT having a high level. When counter value C1 is increased, a delay time of delay circuit 40 may be increased. With a delay time of delay circuit 40 increased, a phase of slave side clock signal CLKSOUT may be delayed.

Referring now to FIG. 6C, when an essentially midpoint timing of transitions in timing reference signal SSPH is substantially coincident in time with respect to a falling edge of master clock signal CLKM, it may be desirable to keep a phase of slave side clock signal CLKSOUT unchanged. In this case, the data setup time Ts of data signal (SD1 to SDm) with respect to master side clock signal CLKM may be essentially the same as a hold time Th. Phase compare input circuit 19 may then output a phase adjustment instruction signal SADJOUT having random level between a high level and a low level. The probability of phase adjustment instruction signal SADJOUT having a high level or a low level may be essentially the same. In this case, counter 39 may keep a counter value C1 at essentially the same value.

When an essentially midpoint timing of transitions in timing reference signal SSPH is substantially coincident in time with respect to a falling edge of master clock signal CLKM and phase adjustment instruction signal SADJOUT randomly becomes a high level or a low level, counter value C1 may remain at essentially the same value. However, when an essentially midpoint timing of transitions in timing reference signal SSPH is late or lags in time with respect to a falling edge of master clock signal CLKM and phase adjustment instruction signal SADJOUT becomes a high level, counter 39 may reduce a counter value C1 each cycle until an essentially midpoint timing of transitions in timing reference signal SSPH is substantially coincident in time with respect to a falling edge of master clock signal CLKM. Likewise, when an essentially midpoint timing of transitions in timing reference signal SSPH is early or leads in time with respect to a falling edge of master clock signal CLKM and phase adjustment instruction signal SADJOUT becomes a low level, counter 39 may increase a counter value C1 each cycle until an essentially midpoint timing of transitions in timing reference signal SSPH is substantially coincident in time with respect to a falling edge of master clock signal CLKM.

In this way, slave side output clock generator circuit 32 may adjust the phase of slave side clock signal CLKSOUT on the basis of a phase adjustment instruction signal SADJOUT such that an essentially midpoint timing of transitions in timing reference signal SSPH may be substantially coincident in time with respect to a falling edge of master clock signal CLKM. By doing so, margins of a setup time and/or a hold time of sampling data signals (SD1 to SDm) by input circuits (12-1 to 12-m) may be essentially maximized and reliability of data being transferred from slave device 30 to master device 10 may be improved.

Referring now to FIG. 4, master side output system 10B and slave side data input system 30B will be described. Master side output system 10B and slave side data input system 30B may be used in an operation of transmitting data signals (MD1 to MDm) from master device 10 to slave device 30.

Output circuits (15-1 to 15-m) may sample data (D1M to DmM) in synchronism with master side clock signal CLKM and output data signals (MD1 to MDm), respectively. Output circuits (15-1 to 15-m) may each provide a delay time of essentially Δt1 with respect to the timing of a falling edge of master side clock signal CLKM.

Data (D1M to DmM) may change logic levels in a predetermined time period referred to as an output period. This output period may be essentially equal to a time interval between successive falling edges of master side clock signal CLKM.

Output circuits (15-1 to 15-m) may output data signals (MD1 to MDm) to output terminals (24-1 to 24-m) based on transmission data (D1M to DmM). Output terminals (24-1 to 24-m) may be connected to output bus signal lines (52-1 to 52-m), respectively. Output bus signal lines (52-1 to 52-m) may be included in output bus 52 (illustrated in FIG. 3). Output bus signal lines (52-1 to 52-m) may transmit data signals (MD1 to MDm) to slave device 30. Slave device 30 may include input terminals (47-1 to 47-m), respectively connected to output bus signal lines (52-1 to 52-m). In this way, master device 10 may provide data signals (MD1 to MDm) to slave device 30 through output terminals (24-1 to 24-m) of master device 10, output bus signal lines (52-1 to 52-m) and input terminals (47-1 to 47-m) of slave device 30.

Input circuits (37-1 to 37-m) of slave device 30 may receive transmission data (D1m to DmM) transmitted from master device 10 to slave device 30. Input circuits (37-1 to 37-m) may sample data signals (MD1 to MDm) received at input terminals (47-1 to 47-m) in synchronism with a falling edge of slave side clock signal CLKSIN.

Slave side clock signal CLKSIN may be generated by permitting slave side clock signal CLKS to be delayed by slave side clock generator circuit 36. Slave side clock generator circuit 36 may include a counter 41 and a delay circuit 42. Counter 41 may hold a counter value C2. Delay circuit 42 may delay slave side clock signal CLKS by a delay time corresponding to counter value C2 held by counter 41 to provide slave side clock signal CLKSIN. A delay of delay circuit 42 may increase as counter value C2 becomes larger. Slave side clock signal CLKSIN generated by delay circuit 42 may be supplied to input circuits (37-1 to 37-m). Input circuits (37-1 to 37-m) may sample data signals (MD1 to MDm) in response to a falling edge of slave side clock signal CLKSIN.

Master side clock signal CLKM and slave side clock signal CLKS may both be generated on the basis of clock signal CLK and may have periods that are essentially coincident with each other. In this way, a sampling period where input circuits (37-1 to 37-m) may sample data signals (MD1 to MDm) may be coincident with an output period of output circuits (15-1 to 15-m). Coincidence of a sampling period of data signals (MD1 to MDm) by input circuits (37-1 to 37-m) and an output period of output circuits (15-1 to 15-m) may be important for proper transmission of data from master device 10 to slave device 30. A sampling period where input circuits (37-1 to 37-m) sample data signals (MD1 to MDm) may be expressed by period $T_{MS}$ and may be essentially the same as an output period of output circuits (15-1 to 15-m).

It may be desirable to provide proper margins for data setup time and/or hold time of data signals (MD1 to MDm) at input circuits (37-1 to 37-m) for proper transmission of data from master device 10 to slave device 30. In the present data transmission system, a phase of slave side clock signal CLKSIN may be adjusted to provide proper margins.

Master side clock signal CLKM may be supplied to timing reference signal generator circuit 16. Timing reference signal generator circuit 16 may generate timing reference signal SMPH based upon master side clock signal CLKM. Timing reference signal generator circuit 16 may include half data shift circuit 20 and timing reference signal output circuit 21.

Half data shift circuit 20 may delay master side clock signal CLKM by one-half a sampling period $T_{MS}$ to generate a delayed clock signal CLKM2.

Timing reference signal output circuit 21 may sample phase adjusting data DMPH using a falling edge of delayed clock signal CLKM2 and may output a timing reference signal SMPH. Phase adjusting data DMPH may successively alternate between "0" and "1" in a repeated manner. In this way, timing reference signal SMPH generated by timing reference signal output circuit 21 may have a frequency that may be essentially one-half a frequency of master side clock signal CLKSM. As will be discussed later, a phase of slave side clock signal CLKSIN may be adjusted on the basis of timing reference signal SMPH.

Timing reference signal SMPH may be provided to an output terminal 25. Output terminal 25 may be connected to timing reference signal transmission bus line 55-2. Timing reference signal transmission bus line 55-2 may be included in timing reference signal transmission bus 55. Timing reference signal transmission bus line 55-2 may be electrically connected to transmit timing reference signal SMPH to slave device 10 at input terminal 48.

Timing reference signal output circuit 21 for generating timing reference signal SMPH may have substantially the same circuit construction as output circuits (15-1 to 15-m) for outputting data signals (MD1 to MDm). Timing reference signal transmission bus line 55-2 and output us signal lines (52-1 to 52-m) may have substantially the same wiring length and substantially the same propagation delay time.

A timing of a logic transition of timing reference signal SMPH at input terminal 48 may be at a time where margins of a setup time and/or a hold time of data signals (MD1 to MDm) may be essentially at a maximum.

Figure 7:
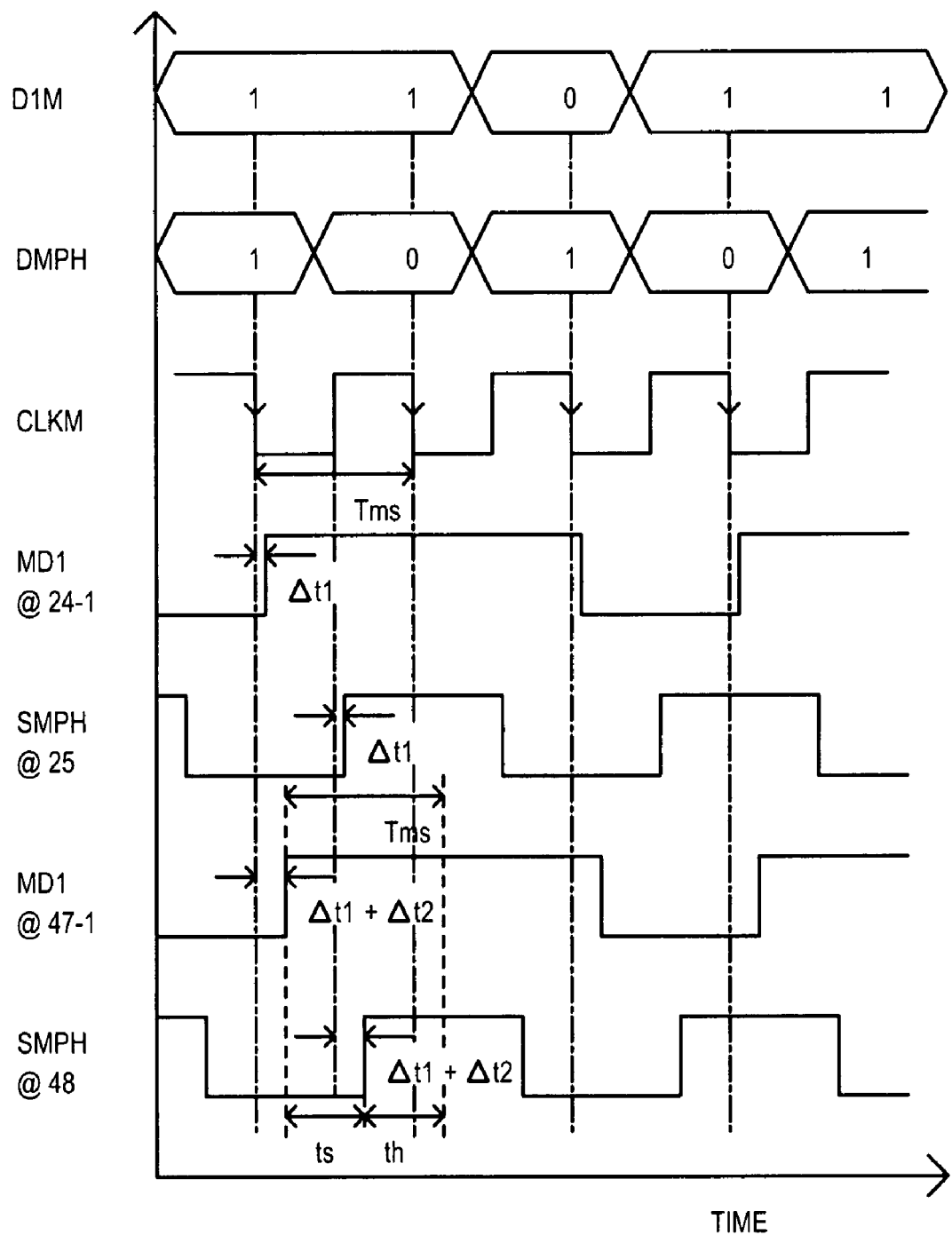
FIG. 7 is a timing diagram illustrating data transfer from a master device to a slave device according to an embodiment.

Referring now to FIG. 7, a timing diagram illustrating data transfer from a master device to a slave device according to an embodiment is set forth.

The timing diagram of FIG. 7 may include waveforms of data D1M, phase adjusting data DMPH, master side clock signal CLKM, data signal MD1 at output terminal 24-1, timing reference signal SMPH at output terminal 25, data signal MD1 at input terminal 47-1, and timing reference signal SMPH at input terminal 48.

Referring now to FIG. 7 in conjunction with FIG. 4, timing reference signal output circuit 21 and output circuits (15-1 to 15-m) may have substantially the same construction and substantially the same delay time Δt1. Thus, data signal MD1 and timing reference signal SMPH may be essentially valid at output terminals (24-1 and 25) respectively after a delay time Δt1 after a falling edge of master side clock signal CLKM. Timing reference signal SMPH may have a transition at output terminal 25 delayed by a time (Tms/2+Δt1) from a falling edge of master side clock signal CLKM. Time Tms may be a sampling period of input circuits (37-1 to 37-m) and an output period of output circuits (15-1 to 15-m). The timing of data signal MD1 transitioning at output terminal 24-1 and a timing of timing reference signal SMPH transitioning at output terminal 25 may be offset from a falling edge of master clock CLKM by essentially one-half sampling period Tms or Tms/2.

Timing reference signal transmission bus line 55-2 and input bus signal line 52-1 may have substantially the same propagation delay time Δt2. Data signal MD1 may be transmitted to input terminal 47-1 through input bus signal line 51-1 such that a transition may occur at essentially (Δt1+Δt2) from a falling edge of master side clock signal CLKM. However, timing reference signal SMPH may be transmitted to input terminal 48 through reference signal transmission bus line 55-2 such that a transition may occur at essentially (Tms/2+Δt1+Δt2) from a falling edge of master side clock signal CLKM. In this way, a timing of a transition of data signal MD1 at input terminal 47-1 and a timing of a transition of timing reference signal SMPH at input terminal 48 may be separated by essentially one-half a sampling period or Tms/2. By separating or displacing a transition of timing reference signal SMPH and a timing of a transition of data signal MD1 (or a timing of data signal MD1 valid) by essentially one-half a sampling period or Tms/2, margins for a data setup time $t_s$ or data hold time $t_h$ may be essentially maximized. In such a way, a timing of a transition of timing reference signal SMPH at input terminal 48 may be such that input circuits (37-1 to 37-m) may sample data signals (MD1 to MDm) while essentially maximum data setup and/or data hold time may be obtained.

A timing of a transition of data signal MD1 and a timing of a transition of timing reference signal SMPH may be provided by a delay time of half data shift circuit 20. By providing half data shift circuit 20 having a delay time of essentially one-half a sampling period Tms, a timing difference between a transition of a data signal MD1 and a timing reference signal SMPH may be essentially one-half a sampling period Tms.

Referring to FIG. 4, timing compare circuit 38 may generate phase adjustment instruction signal SADJIN for instructing an adjustment of a phase of slave side clock signal CLKSIN based upon a timing of slave side clock signal CLKSIN and timing reference signal SMPH. Timing compare circuit 38 may output phase adjustment instruction signal SADJIN to slave side input clock generator circuit 36. Slave side input clock generator circuit 36 may include a counter circuit 41 and a delay circuit 42. Counter circuit 41 may adjust a counter value C2, held by counter 41, based on position adjustment instruction signal SADJIN. Counter 41 may reduce a counter value C2 in response to phase adjustment instruction signal SADJIN having a low level. When counter value C1 is reduced, a delay time of delay circuit 42 may be increased. With a delay time of delay circuit 42 shortened, a phase of slave side clock signal CLKSOUT may be led or moved in. Counter 41 may increase a counter value C2 in response to phase adjustment instruction signal SADJIN having a high level. When counter value C2 is increased, a delay time of delay circuit 42 may be increased. With a delay time of delay circuit 42 increased, a phase of slave side clock signal CLKSOUT may be delayed or moved out.

Slave side clock signal CLKSIN may have a phase set such that a timing of a falling edge of slave side clock signal CLKSIN may be essentially coincident with a timing of a transition of timing reference signal SMPH. In this way, when data signals (MD1 to MDm) are sampled on the basis of slave side clock signal CLKSIN, a data setup time and/or data hold time may be essentially at a maximum.

Timing compare circuit 38 may generate position adjustment instruction signal SADJIN such that a timing of a falling edge of slave side clock signal CLKSIN may be essentially coincident with a timing of a transition of timing reference signal SMPH.

Frequency divider circuit 43 may be included in timing compare circuit 38 and may divide a frequency of slave side clock signal CLKSIN and generate a frequency division clock signal CLKSIN1. Frequency division clock signal CLKSIN1 may have a frequency that is essentially one-half a frequency of slave side clock signal CLKSIN.

Timing compare circuit 38 may also include a phase compare input circuit 44. Phase compare input circuit 44 may sample a timing reference signal SMPH when frequency division clock CLKSIN1 has a falling edge transition to generate position adjustment instruction signal SADJIN.

Figure 8:
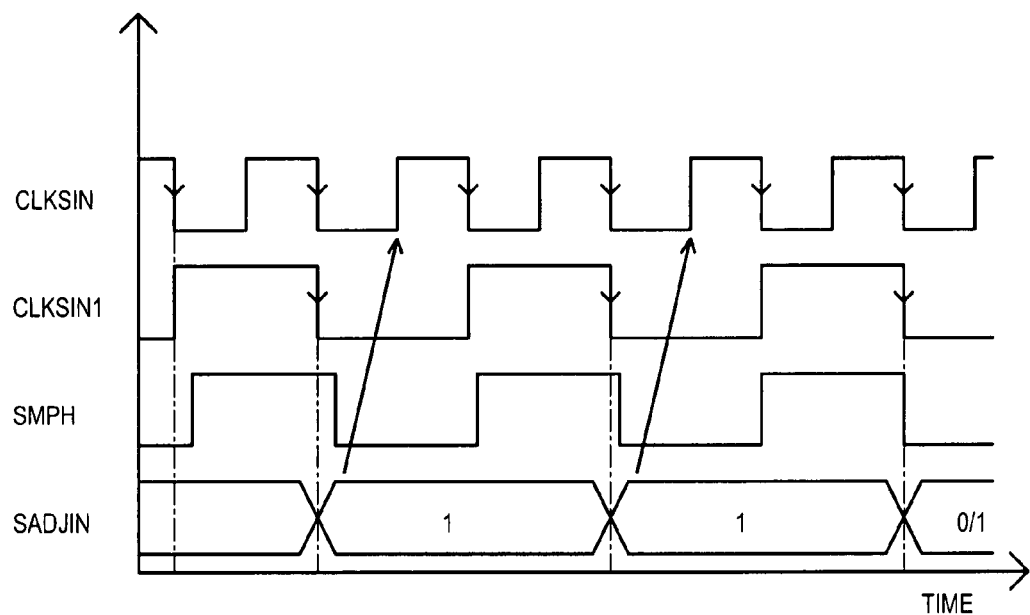
FIG. 8 is a timing diagram illustrating a phase adjustment of a timing reference signal according to an embodiment.

FIG. 8 is a timing diagram illustrating a phase adjustment of a timing reference signal SMPH according to an embodiment.

Referring now to FIG. 8 in conjunction with FIG. 4, phase compare circuit 44 may output a phase adjustment instruction signal SADJIN having a high level ("1") if timing reference signal SMPH has a high level at a falling edge of frequency division clock signal CLKSIN1. However, phase compare circuit 44 may output a phase adjustment instruction signal SADJIN having a low level ("0") if timing reference signal SMPH has a low level at a falling edge of frequency division clock signal CLKSIN1. In this way, phase adjustment instruction signal SADJIN may have a predetermined logic level depending on a phase relationship between timing reference signal SMPH and frequency division clock signal CLKSIN1.

As illustrated in FIG. 8, when a transition of reference signal SMPH is later in time than a falling edge of frequency division clock signal CLKSIN1, a phase of slave side clock signal CLKSIN may need to be delayed. In this case, phase compare input circuit 44 may output a phase adjustment instruction signal SADJIN having a high level. With phase adjustment instruction signal SADJIN at a high level, counter 41 may increase a counter value C2. When counter value C2 becomes larger, a delay time of delay circuit 42 may be increased and a phase of slave side clock signal CLKSIN may be more delayed. In this way, a phase of slave side clock signal CLKSIN may be adjusted so that a timing of a transition of phase adjusting signal SMPH may be essentially coincident with a timing of a falling edge of frequency division clock signal CLKSIN1.

Alternatively, when a transition of reference signal SMPH is earlier in time than a falling edge of frequency division clock signal CLKSIN1, a phase of slave side clock signal CLKSIN may need to be made earlier. In this case, phase compare input circuit 44 may output a phase adjustment instruction signal SADJIN having a low level. With phase adjustment instruction signal SADJIN at a low level, counter 41 may decrease a counter value C2. When counter value C2 becomes smaller, a delay time of delay circuit 42 may be decreased and a phase of slave side clock signal CLKSIN may be less delayed. In this way, a phase of slave side clock signal CLKSIN may be adjusted so that a timing of a transition of phase adjusting signal SMPH may be essentially coincident with a timing of a falling edge of frequency division clock signal CLKSIN1.

When a transition of reference signal SMPH is substantially coincident in time than a falling edge of frequency division clock signal CLKSIN1, a phase of slave side clock signal CLKSIN may need to essentially remain the same. In this case, phase compare input circuit 44 may output a phase adjustment instruction signal SADJIN having a high or a low level in an essentially random fashion and a delay time of delay circuit 42 may essentially remain the same. Thus, a phase of slave side clock signal CLKSIN may be essentially kept constant.

When a transition of reference signal SMPH is substantially coincident in time than a falling edge of frequency division clock signal CLKSIN1 and a phase adjustment instruction signal SADJIN randomly becomes a high level or a low level, counter value C2 may remain essentially at the same value. However, when a transition of reference signal SMPH is later in time than a falling edge of frequency division clock signal CLKSIN1 and a phase adjustment instruction signal SADJIN becomes a high level, counter 41 may increase a counter value C2 each cycle until a transition of reference signal SMPH is substantially coincident in time than a falling edge of frequency division clock signal CLKSIN1. When a transition of reference signal SMPH is earlier in time than a falling edge of frequency division clock signal CLKSIN1 and a phase adjustment instruction signal SADJIN becomes a high level, counter 41 may decrease a counter value C2 each cycle until a transition of reference signal SMPH is substantially coincident in time than a falling edge of frequency division clock signal CLKSIN1.

In this way, slave side input clock generator circuit 36 may adjust a phase of slave side clock signal CLKSIN on the basis of a phase adjustment instruction signal SADJIN such that a transition of reference signal SMPH is substantially coincident in time than a falling edge of frequency division clock signal CLKSIN1. By doing so, margins of a setup time and/or hold time of sampling data signals (MD1 to MDm) by input circuits (37-1 to 37-m) may be essentially maximized and reliability of data being transferred from master device 10 to slave device 30 may be improved.

In a data transfer system according to the present embodiment, a phase of slave side clock signal CLKSOUT may be adjusted on the basis of a phase adjustment instruction signal SADJOUT. Phase adjustment instruction signal SADJOUT may be generated on the basis of a difference between a timing of a transition of a timing reference signal SSPH and a timing of a falling edge of a master side clock signal CLKM when data is transmitted from a slave device 30 and a master device 10. In this way, margins of a setup time and/or hold time of sampling data signals (SD1 to SDm) by input circuits (12-1 to 12-m) synchronously with master side clock signal CLKM may be essentially maximized.

Further, in a data transfer system according to the present embodiment, a phase of slave side clock signal CLKSIN may be adjusted on the basis of a phase adjustment instruction signal SADJIN. Phase adjustment instruction signal SADJIN may be generated on the basis of a difference between a timing of a transition of a timing reference signal SMPH and a timing of a falling edge of a frequency division clock signal CLKSIN1 when data is transmitted from a master device 10 to a slave device 30. In this way, margins of a setup time and/or hold time of sampling data signals (MD1 to MDm) by input circuits (37-1 to 37-m) synchronously with slave side clock signal CLKSIN may be essentially maximized.

An adjustment of a phase of slave side clock signal CLKSOUT and an adjustment of a phase of slave side clock signal CLKSIN may be independently provided for every slave device 30 in a system. In this way, even though there may be variations of characteristics of an initial stage amplifier 31 included in each slave device 30, such variations may be prevented from influencing margins of a data setup time and/or a hold time. Also, even though characteristics of an initial stage amplifier 31 included in each slave device 30 may vary due to operating conditions, such as temperature and power supply voltage, such variations may also be prevented from influencing margins of a data setup time and/or a hold time.

By providing half data shift circuit 17 on master device 10, variations of characteristics of slave device 30 may not deteriorate margins for a data setup time and/or hold time of data signals (SD1 to SDm) sampled at input circuits (12-1 to 12-m). If a circuit corresponding to half data shift circuit 17 is provided on slave device 30, variations of characteristics of slave device 30 may deteriorate margins for a data setup time and/or a hold time. By providing half data shift circuit 17 on master device 10, margins for a data setup time and/or hold time may be improved.

Also, by providing half data shift circuit 20 on master device, variations of characteristics of slave device 30 may not deteriorate margins for a data setup time and/or hold time of data signals (MD1 to MDm) sampled at input circuits (37-1 to 37-m).

Timing reference signal SMPH may be transmitted to any slave device 30 through a common timing reference signal transmission bus line 55-2 of a common timing reference signal transmission bus 55. Likewise, timing reference signal SSPH may be transmitted from any slave device 30 to master device 10 through a common timing reference signal transmission bus line 55-1 of a common timing reference signal transmission bus 55. The transmission of timing reference signal SSPH from each slave device 30 and the transmission of timing reference signal SMPH to each slave device 30 may be achieved in a time division manner.

Figure 9:
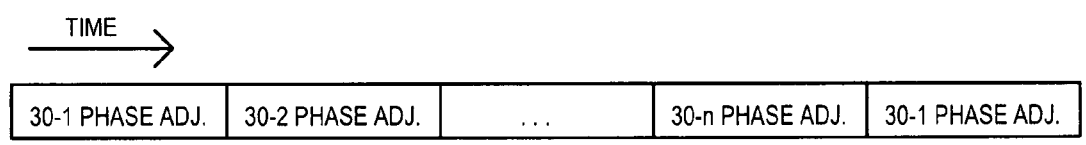
FIG. 9 is a timing diagram illustrating a phase adjustment of clock signals in a plurality of slave devices according to an embodiment.

Referring now to FIG. 9, a timing diagram illustrating a phase adjustment of clock signals in a plurality of slave devices according to an embodiment.

First, timing reference signal SSPH and timing reference signal SMPH may be transmitted between master device 10 and a slave device 30-1. In this way, adjustments may be made to phases of slave side clock signal CLKSOUT and slave side clock signal CLKSIN of slave device 30-1.

Successively, timing reference signal SSPH and timing reference signal SMPH may be transmitted between master device 10 and a slave device 30-2. In this way, adjustments may be made to phases of slave side clock signal CLKSOUT and slave side clock signal CLKSIN of slave device 30-2. Similarly, timing reference signal SSPH and timing reference signal SMPH may be transmitted between master device 10 and another slave device 30 in succession and adjustments may be made to phases of slave side clock signal CLKSOUT and slave side clock signal CLKSIN of another slave device 30.

Transmission of timing reference signal SSPH from each slave device 30 and transmission of timing reference signal SMPH to each slave device 30 may be achieved in a time division along a common timing reference signal transmission bus 55. In this way, the number of bus lines between master device 10 and slave device 30 may be reduced.

In the present embodiment, phase adjusting data DSPH used for generation of timing reference signal SSPH is not limited to alternately and repeatedly transitioning between a high level ("1") and a low level ("0") every cycle. Phase adjusting data DSPH may for example include a low level applied for $n_1$ cycles and a high level applied for $n_1$ cycles alternately and repeatedly where $n_1$ is a natural number of 1 or more. In this case, timing reference signal SSPH may have a frequency of $1/(2n_1)$ of slave side clock signal CLKSOUT. Further, frequency divider circuit 18 may be substituted with a frequency divider circuit providing a frequency division clock signal CLKM1 obtained by frequency dividing master side clock signal CLKM by $1/(2n_1)$. In this way, timing reference signal SSPH may only be generated essentially one time for $n_1$ cycles and power consumption may be reduced.

In a similar fashion, phase adjusting data DMPH used for generation of timing reference signal SMPH is not limited to alternately and repeatedly transitioning between a high level ("1") and a low level ("0") every cycle. Phase adjusting data DMPH may for example include a low level applied for $n_2$ cycles and a high level applied for $n_2$ cycles alternately and repeatedly where $n_2$ is a natural number of 1 or more. In this case, timing reference signal SMPH may have a frequency of $1/(2n_2)$ of master side clock signal CLKM. Further, frequency divider circuit 43 may be substituted with a frequency divider circuit providing a frequency division clock signal CLKSIN1 obtained by frequency dividing slave side clock signal CLKSIN by $1/(2n_2)$. In this way, timing reference signal SMPH may only be generated essentially one time for $n_2$ cycles and power consumption may be reduced.

Further, in a data transmission system according to the present embodiment, output circuits (15-1 to 15-m) and output circuits (33-1 to 33-m), respectively included in master device 10 and slave device 30, may sample data in synchronism with a falling edge of a clock signal and output data to an output terminal. Input circuits (12-1 to 12-m) and input circuits (37-1 to 37-m), respectively included in master device 10 and slave device 30, may sample a data signal received at an input terminal in synchronism with a falling edge of a clock signal and output data to predetermined internal circuits. Output circuits (15-1 to 15-m), output circuits (33-1 to 33-m), input circuits (12-1 to 12-m), and input circuits (37-1 to 37-m) may be input/output circuits where sampling and/or outputting data may be essentially simultaneously performed with consideration of propagation delays.

Output circuits (15-1 to 15-m), output circuits (33-1 to 33-m), input circuits (12-1 to 12-m), and input circuits (37-1 to 37-m) may include a latch or flip-flop circuit. By doing so, output circuits (15-1 to 15-m), output circuits (33-1 to 33-m), input circuits (12-1 to 12-m), and input circuits (37-1 to 37-m) may sample data in synchronism with a first clock edge while outputting previous data latched. In this way, a propagation delay, for example delay time Δt1 of output circuits (15-1 to 15-m), output circuits (33-1 to 33-m), input circuits (12-1 to 12-m), and input circuits (37-1 to 37-m) may be essentially eliminated so that data may be provided essentially coincident with a clock edge.

Timing of data sampling and outputting may be performed by input circuits (12-1 to 12-m) and output circuits (15-1 to 15-m) in master device 10 and by input circuits (37-1 to 37-m) and output circuits (33-1 to 33-m) in slave device 30 in synchronism with a rising edge and a falling edge of a clock signal, as just one example. In this situation, sampling periods ($T_{SM}$ and $T_{MS}$) may be a time interval between a rising edge and a falling edge of the clock signal. Furthermore, output circuits (15-1 to 15-m), output circuits (33-1 to 33-m), input circuits (12-1 to 12-m), and input circuits (37-1 to 37-m) may sample or provide data synchronously with a rising clock edge or a delay with respect to a clock edge, as just a few examples.

Figure 11:
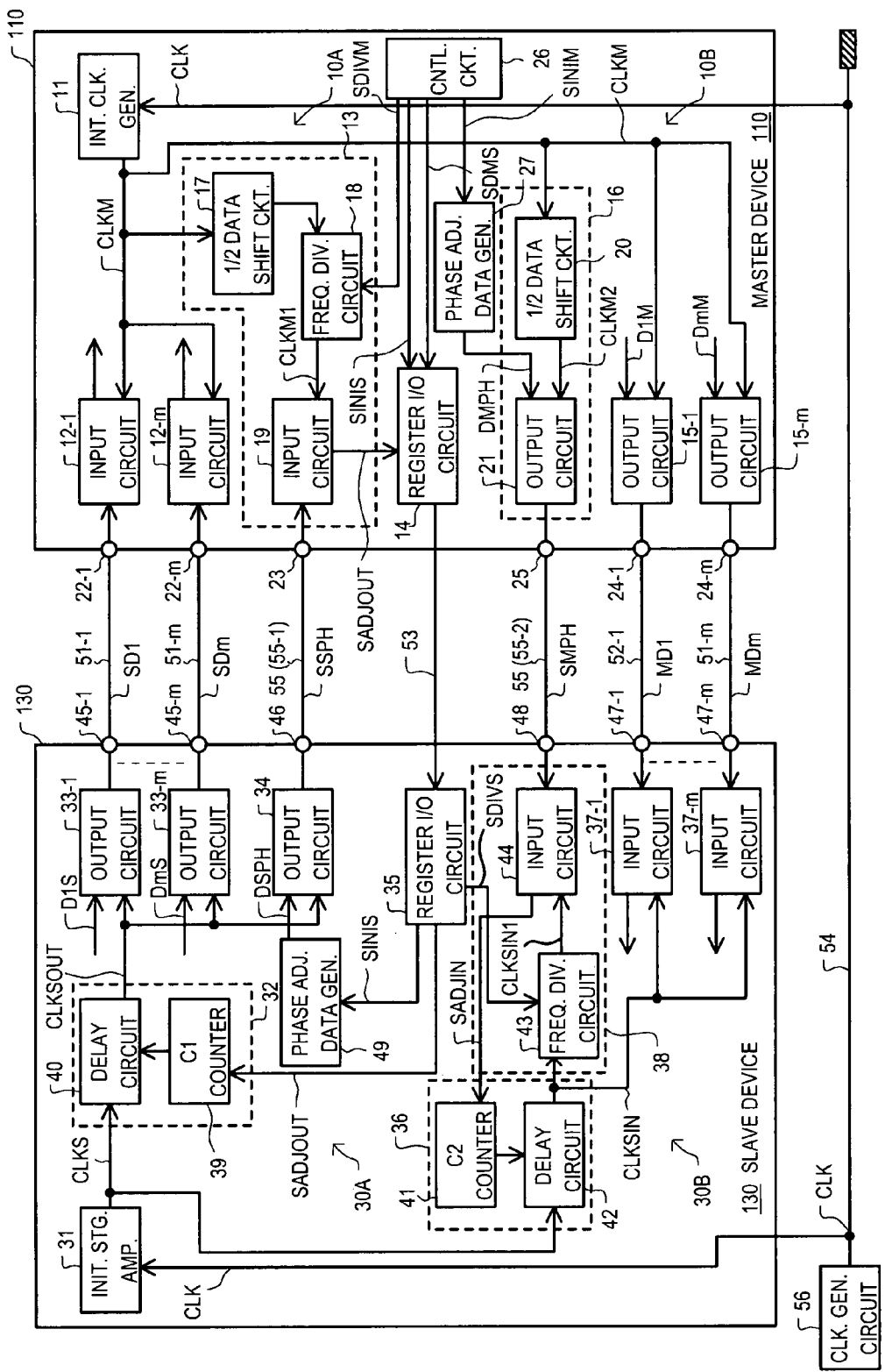
FIG. 11 is a block schematic diagram of a construction of a master device and a slave device according to an embodiment.

Referring now to FIG. 11, a construction of a master device 110 and a slave device 130 according to an embodiment are set forth in a block schematic diagram. Master device 110 and slave device 130 may respectively correspond to master device 10 and slave device 30 of FIG. 3. The data transmission system illustrated in FIG. 11 may differ from the data transmission system illustrated in FIG. 4 in that phase adjusting data DSPH and DMPH may be made variable in response to situations.

Master device 110 may differ from master device 10 in that master device 110 may include a control circuit 26 and a phase adjusting data generator circuit 27. Construction of other portions of master device 110 may be similar as that of master device 10 and as such may be referred to by the same reference characters. Slave device 130 may differ from slave device 30 in that slave device 130 may include a phase adjusting data generator 49. Construction of other portions of slave device 130 may be similar as that of slave device 30 and as such may be referred to by the same reference characters.

In the present embodiment, reference signal output circuit 34 may receive phase adjusting data DSPH and may output timing reference signal SSPH. In this case, output timing reference signal SSPH may have a continuous low level ("0") for $n_1$ cycles and a continuous high level ("1") for $n_1$ cycles alternatively repeated, where $n_1$ is a natural number.

Control circuit 26 may be used to define a value for $n_1$. Control circuit 26 may generate phase adjusting data instruction signal SINIS. Phase adjusting data instruction signal SINIS may specify a value for $n_1$. Phase adjusting data instruction signal SINIS may be transmitted to phase adjusting data generator circuit 49 through register I/O circuit 14, register I/O bus 53, and register I/O circuit 35. Phase adjusting data generator circuit 49 may generate phase adjusting data DSPH having a continuous low level ("0") for $n_1$ cycles and a continuous high level ("1") for $n_1$ cycles alternatively repeated in response to phase adjusting data instruction data instruction signal SINIS. Timing reference signal output circuit 34 may receive phase adjusting data DSPH.

Control circuit 26 may also provide a frequency division instruction signal SDIVM to frequency divider circuit 18. Frequency divider circuit 18 may divide a master side clock signal CLKM in response to frequency division instruction signal SDIVM and may generate a frequency division clock signal CLKM1. Frequency division clock signal CLKM1 may have a frequency that is essentially $1/(2n_1)$ of a frequency of master side clock signal CLKM. Phase compare input circuit 19 may receive frequency division clock signal CLKM1.

In a similar fashion, phase adjusting data DMPH may be receive by output circuit 21 for generating output timing reference signal SMPH which may have a continuous low level ("0") for $n_2$ cycles and a continuous high level ("1") for $n_2$ cycles alternatively repeated, where $n_2$ is a natural number.

Control circuit 26 may be used to define a value for $n_2$. Control circuit 26 may generate phase adjusting data instruction signal SINIM. Phase adjusting data instruction signal SINIM may specify a value for $n_2$. Phase adjusting data instruction signal SINIM may be transmitted to phase adjusting data generator circuit 27. Phase adjusting data generator circuit 27 may generate phase adjusting data DMPH having a continuous low level ("0") for $n_2$ cycles and a continuous high level ("1") for $n_2$ cycles alternatively repeated in response to phase adjusting data instruction data instruction signal SINIM. Timing reference signal output circuit 32 may receive phase adjusting data DMPH.

Control circuit 26 may generate frequency division instruction signal SDIVM to frequency division circuit 43 through register I/O circuit 14, register I/O bus 53, and register I/O circuit 35. Frequency division instruction signal SDIVM may provide a value for $n_2$ to frequency division circuit 43. Frequency division circuit 43 may frequency divide slave side clock signal CLKSIN in response to frequency division instruction signal SDIVM and may generate a frequency division clock signal CLKSIN1. Frequency division clock signal CLKINI may have a frequency that is essentially $1/(2n_2)$ of a frequency of slave side clock signal CLKSIN.

The values of $n_1$ and $n_2$ defined by control circuit 26 may both be variable. Control circuit 26 may define $n_1$ as an initial value $n_1^{INI}$ just after data transmission system according to the present embodiment is initialized or started. Then, after the lapse of a predetermined time, control circuit 26 may define $n_1$ as $n_1^{STD}$, where $n_1^{STD} < n_1^{INI}$.

By initially providing a smaller $n_1$ as $n_1^{STD}$ after initialization, phases of timing reference signal SSPH and master side clock signal CLKM may be compared with a greater frequency. In this way, slave side clock signal CLKSOUT may be more finely adjusted.

However, a smaller value of $n_1$ may create the following problem.

It may be desired to have slave side clock signal CLKS delayed by as small as possible delay using delay circuit 40. This is because a delay time of delay circuit 40 may have an upper limit due to circuit restrictions. When a timing of a falling edge of timing reference signal SSPH is severely later than a timing of a falling edge of frequency division clock signal CLKM1 as to be later by more than a time $n_1 \times Tsm$ an extremely large delay may need to be provided by delay circuit 40. Tsm may be a period of sampling data signals (SD1 to SDM) by input circuits (12-1 to 12-m).

Figure 10A:
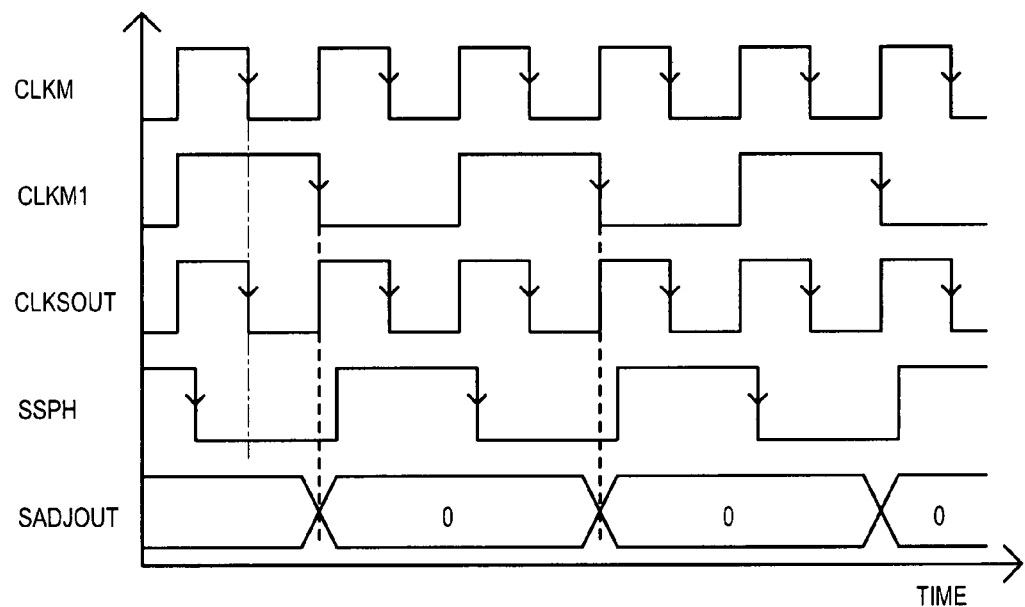
FIGS. 10A and 10B are timing diagrams illustrating phase adjustment for differing values of $n_1$ according to an embodiment.
Figure 10B:
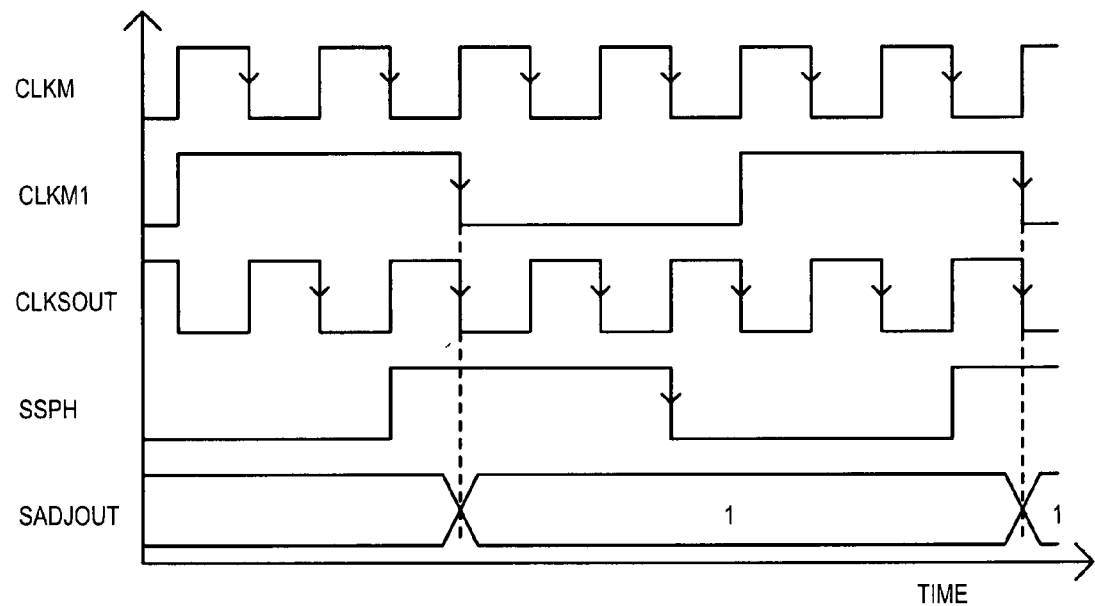

FIGS. 10A and 10B are timing diagrams illustrating phase adjustment for differing values of $n_1$ according to an embodiment. FIG. 10A may illustrate a phase adjustment when $n_1=1$. FIG. 10B may illustrate a phase adjustment when $n_1=2$.

Referring now to FIG. 10A, a case where a timing of a falling edge of timing reference signal SSPH is severely later than a timing of a falling edge of frequency division clock signal CLKM1 as to be later by more than a time $n_1 \times Tsm$ ($n_1=1$) is set forth. In this case, a timing for a falling edge of timing reference signal SSPH is later than a timing of a falling edge where frequency division clocks signal CLKM1 falls, phase adjustment instruction signal SADJOUT may become logic low ("0"). Thus, slave side output clock generator circuit 32 may be instructed to delay a phase of slave side clock signal CLKSOUT. In this case, slave side clock signal CLKSOUT must be delayed by at least a sampling period Tsm to provide a timing reference signal SSPH that may be essentially coincident with frequency division clock signal CLKM1. Delaying slave side clock signal CLKSOUT by more than a sampling period Tsm by delay circuit 40 may not be an optimal method and may require the use of an undesirably large delay which may be problematic. It may be noted that a falling edge of frequency division clock signal CLKM1 for the subsequent cycle was closer to a falling edge of timing reference signal SSPH and it may have been preferable to advance the phase of slave side clock signal CLKSOUT by less than a sampling period Tsm.

However, such a problem may not occur when a difference between a falling edge of frequency clock signal CLKM1 and a falling edge of timing reference signal SSPH is less than a time $n_1 \times Tsm$.

Referring now to FIG. 10B, a case where a time $n_1=2$ is set forth. In this case, a difference between a falling edge of frequency clock signal CLKM1 and a falling edge of timing reference signal SSPH is greater than Tsm, but less than $n_1 \times Tsm$. Phase adjustment instruction signal SADJOUT may be a high level ("1"). Thus, slave side output clock generator circuit 32 may be instructed to advance a phase of slave side clock signal CLKSOUT. Because timing reference signal SSPH may transition only one time for every $n_1$, any change in delay provided by delay circuit 40 may also be multiplied with regard to providing an adjustment to a coincidence of a phase of timing reference signal SSPH and frequency clock signal CLKM1. In this way, a greater adjustment may be made with a smaller delay change in delay circuit 40. Thus, when an allowable range of a difference between timing of a transition (falling edge) of timing reference signal SSPH and a transition of frequency division clock signal CLKM1 is relatively large, a desired value for $n_1$ may be defined to be larger.

In a data transmission system according to the present embodiment, $n_1$ may be defined as $n_1^{INI}$ during an initialization. After a predetermined lapse in time or number or executed cycles, $n_1$ may be defined as $n_1^{STD}$, where $n_1^{STD} < n_1^{INI}$. In this way, slave side clock signal CLKSOUT may be initially adjusted with an allowable range of a difference between timing of a transition of timing reference signal SSPH and a transition of frequency division clock signal CLKSM1 may be relatively large to allow for greater adjustments and later may be adjusted more frequently to allow for a finer coincidence matching.

After initialization, it may be possible for a severe time difference between a transition of timing reference signal SSPH and a transition of frequency division clock signal CLKM1. In this case, $n_1$ may be defined as $n_1^{INI}$ having a larger value than $n_1^{STD}$. In his way, slave side clock signal CLKSOUT may be adjusted without an unnecessarily large delay time provided by delay circuit 40. When n, is defined as $n_1^{INI}$, a phase of slave slide clock signal CLKSOUT may be adjusted in a predetermined time. In this way, a desired transition of timing reference signal SSPH and a desired transition of frequency division clock signal CLKM1 may be substantially brought into a coincidence.

Thereafter, control circuit 26 may define $n_1$ as $n_1^{STD}$, which may be smaller than $n_1^{INI}$. Once $n_1$ is defined as being $n_1^{STD}$, adjustments of slave side clock signal CLKSOUT may increase in frequency. In such an example, great adjustments of slave side clock signal CLKSOUT may initially be made, then subsequently adjustments of slave side clock signal CLKSOUT may be made more frequently. In this case, $n_1^{STD}$ being 1 may provide the greatest frequency of adjustments of a phase of slave side clock signal CLKSOUT.

In a similar manner as the above discussions, $n_2$ may have a value provided for providing frequency and range of adjustments to a phase of slave side clock signal CLKSIN. When a phase of slave side clock signal CLKSIN is to be adjusted more frequently, $n_2$ may be defined to have a smaller value. When there is a larger allowable range of a timing difference between a transition of timing reference signal SMPH and a transition of frequency division clock signal CLKSIN1, $n_2$ may be defined to have a larger value.

Control circuit 26 may define $n_2$ as $n_2^{INI}$ after an initialization of the data transmission system. Then, after the lapse of a predetermined time, control circuit 26 may define $n_2$ as $n_2^{STD}$, where $n_2^{STD} < n_2^{INI}$. In this way, initially, a phase of slave side clock signal CLKSIN may be adjusted with an allowance for a greater adjustment with smaller changes in a delay time of delay circuit 42. By providing a smaller $n_2$ as $n_2^{STD}$ after initialization, phases of timing reference signal SMPH and slave side clock signal CLKSIN1 may be compared with a greater frequency. In this way, slave side clock signal CLKSIN may be more finely adjusted. Similarly, it may be desirable to have $n_2^{STD}$ being 1 to provide the greatest frequency of adjustments of a phase of slave side clock signal CLKSIN.

Figure 12:
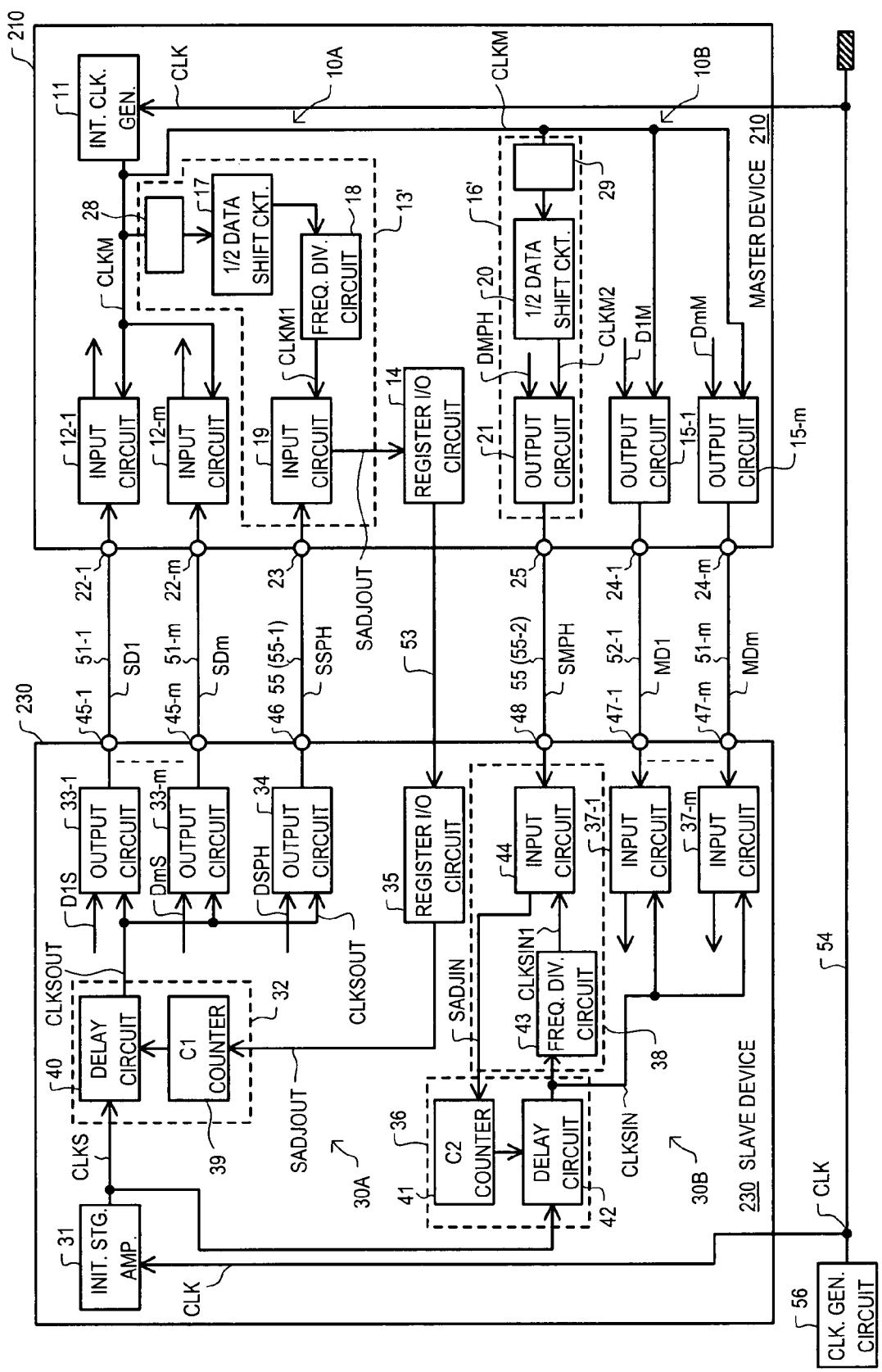
FIG. 12 is a block schematic diagram of a construction of a master device and a slave device according to an embodiment.

Referring now to FIG. 12, a construction of a master device 210 and a slave device 230 according to an embodiment are set forth in a block schematic diagram. Master device 210 and slave device 230 may respectively correspond to master device 10 and slave device 30 of FIG. 3. The data transmission system illustrated in FIG. 12 may differ from the data transmission system illustrated in FIG. 4 in that master device 210 may include a shift amount adjusting circuit 28 and a shift amount adjusting circuit 29. Timing compare circuit 13' may include shift amount adjusting circuit 28. Timing reference signal generator 16' may include shift amount adjusting circuit 29.

Construction of other portions of master device 210 may be similar as that of master device 10 and as such may be referred to by the same reference characters. Construction of slave device 230 may be similar as that of slave device 30 and as such may be referred to by the same reference characters.

Shift amount adjusting circuit 28 may shift master side clock signal CLKM by a shift amount $\Delta t_d^{SM}$. Shifted master side clock signal CLKM may be received by half data shift circuit 17. Master side clock signal CLKM may be shifted by approximately $(T_{SM}/2) + \Delta t^{SM}$ by half data shift circuit 17 and shift amount adjusting circuit 28 to provide frequency division clock signal CLKM1. Shift amount $\Delta t_d^{SM}$ may take any of positive and negative values. In this way, a phase of slave side clock signal CLKSOUT may be adjusted such than a timing that is essentially at a midpoint between consecutive transitions of timing reference signal SSPH may be displaced in time essentially by shift amount $\Delta t_d^{SM}$ with respect to a timing of a falling edge of master side clock signal CLKM.

By adjusting a phase of slave side clock signal CLKSOUT in such a way, reliability in transferring data from slave device 230 to master device 210 may be improved. Input circuits (12-1 to 12-m) may sample data signals (SD1 to SDm) transmitted from slave device 230 to master device 210 more reliably by providing a timing of a falling edge of master side clock signal CLKM that is slightly shifted with respect to an essentially midpoint timing between consecutive transitions of timing reference signal SSPH. Shift amount $\Delta t_d^{SM}$ may assure a fine adjustment of data setup time and/or hold time for data signals (SD1 to SDm) with respect to master side clock signal CLKM. In this way, master device 210 may receive data from slave device 230 more reliably.

Shift amount adjusting circuit 29 may shift master side clock signal CLKM by shift amount $\Delta t_d^{MS}$. Half data shift circuit 20 may receive shifted master side clock signal CLKM and may provide a delayed clock signal CLKM2 that may be shifted by approximately $(T_{MS}/2) + \Delta t_d^{MS}$ with respect to master side clock signal CLKM. In this way, a phase of slave side clock signal CLKSIN may be adjusted so that a timing of a falling edge of slave side clock signal CLKSIN may essentially be advanced in time by shift amount $\Delta t_d^{MS}$ with respect to a timing where timing reference signal SMPH has a transition. By doing so, input circuits (37-1 to 37-m) may sample data signals (MD1 to MDm) more reliably by providing a timing of a falling edge of slave side clock signal CLKSIN that may essentially be advanced in time by shift amount $\Delta t_d^{MS}$ with respect to a timing where timing reference signal SMPH has a transition. Shift amount $\Delta t_d^{MS}$ may assure a fine adjustment of data setup time and/or hold time for data signals (MD1 to MDm) with respect to slave side clock signal CLKSIN. In this way, slave device 230 may receive data from master device 210 more reliably.

Figure 13:
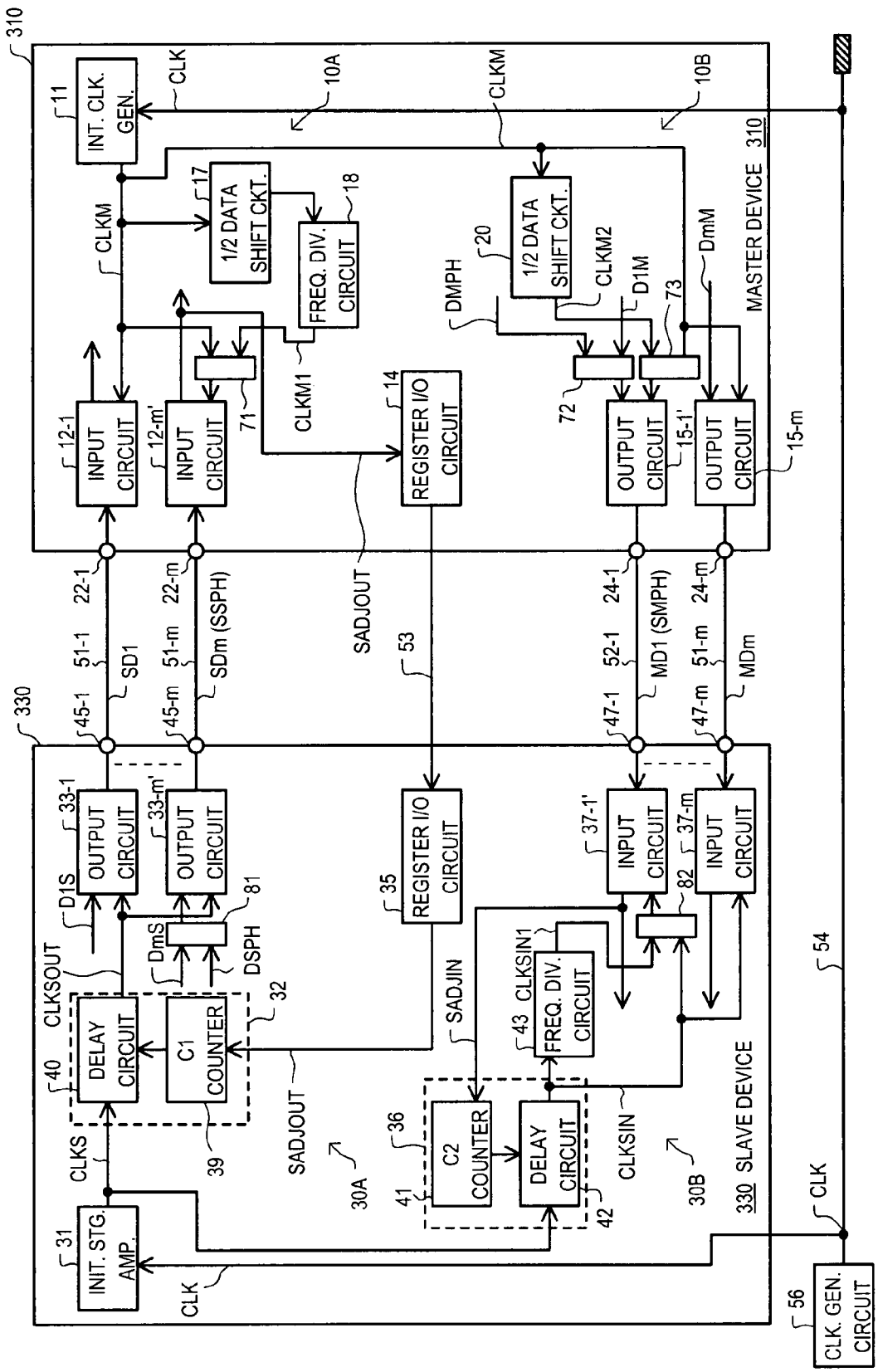
FIG. 13 is a block schematic diagram of a construction of a master device and a slave device according to an embodiment.

Referring now to FIG. 13, a construction of a master device 310 and a slave device 330 according to an embodiment are set forth in a block schematic diagram. Master device 310 and slave device 330 may respectively correspond to master device 10 and slave device 30 of FIG. 3.

The data transmission system illustrated in FIG. 13 may have similar constituents as data transmission system illustrated in FIG. 4 and such constituents may be referred to by the same reference characters.

The data transmission system illustrated in FIG. 13 may differ from the data transmission system illustrated in FIG. 4 in that an exclusive timing reference signal transmission bus 55 for transmitting timing reference signals (SSPH and SMPH) may not be provided. Instead, use may be made of a portion of input bus 51 and output bus 52 to transmit timing reference signals (SSPH and SMPH), respectively.

By doing so, in data transmission system illustrated in FIG. 13, timing reference signal output circuit 34 may not be provided for generating timing reference signal. Instead, a data switching circuit 81 may be included. Data switching circuit 81 may selectively output either data DmS or phase adjusting data DSPH to output circuit 33-m'. In this way, output circuit 33-m' may provide a data signal SDm and may provide timing reference signal SSPH.

In master device 310, a phase compare input circuit 19, as in FIG. 4, for generating phase adjustment instruction signal SADJOUT may not be provided. Instead a clock switching circuit 71 may be provided. Clock switching circuit 71 may selectively output either master side clock signal CLKM or frequency division clock signal CLKM1 to input circuit 12-m'. In addition to sampling data signal SDm, input circuit 12-m' may sample timing reference signal SSPH to generate phase adjustment instruction signal SADJOUT.

Also, as compared to master device 10 of FIG. 4, master device 310 of the embodiment of FIG. 13 may not include a timing reference signal output circuit 21 for generating timing reference signal SMPH. Instead, master device 310 may include data switching circuit 72 and clock switching circuit 73. Data switching circuit 72 may selectively output either phase adjusting data DMPH or transmission data DIM to output circuit 15-1'. Clock switching circuit 73 may selectively output either master side clock signal CLKM or delay clock signal CLKM2 to output circuit 15-1'. Besides the generation of data signal MD1, output circuit 15-1' may generate timing reference signal SMPH.

As compared to slave device 30 of FIG. 4, slave device 330 of the embodiment of FIG. 13 may not include phase compare input circuit 44 for generating phase adjustment instruction signal SADJIN. Instead, slave device 330 may include a clock switching circuit 82. Clock switching circuit 82 may selectively output either slave side clock signal CLKSIN or frequency division clock signal CLKSIN1 to input circuit 37-1'. In addition to sampling data signal MD1, input circuit 37-1' may sample timing reference signal SMPH in synchronism with frequency division clock signal CLKSIN1 to generate phase adjustment instruction signal SADJIN.

In the embodiment illustrated in FIG. 13, transmission of data (D1S to DmS) from slave device 310 to master device 330 and an adjustment of a phase of slave side clock signal CLKSOUT may be executed in a mutually exclusive manner.

When data (D1S to DmS) is transmitted from slave device 330 to master device 310, output circuits (33-1 to 33-m') may sample data (D1S to DmS) in synchronism with slave side clock signal CLKSOUT to generate data signals (SD1 to SDm). In this case, data switching circuit 81 may provide data DmS as an input to output circuit 33-m'. Output circuit 33-m' may sample data DmS in synchronism with slave side clock signal CLKSOUT to generate data signal SDm. In this way, data signals (SD1 to SDm) may be transmitted to master device 310. Clock switching circuit 71 included in master device 310 may supply master side clock signal CLKM to input circuit 12-m'. In this way, input circuits (12-1 to 12-m') may sample data signals (SD1 to SDm) in synchronism with master side clock signal CLKM.

However, when a phase of slave side clock signal CLKSOUT is to be adjusted, data switching circuit 81 may output phase adjusting data DSPH to output circuit 33-m'. Output circuit 33-m' may sample phase adjusting data DSPH in synchronism with slave side clock signal CLKSOUT to generate timing reference signal SSPH. Timing reference signal SSPH may be transmitted to input circuit 12-m'. Clock switching circuit 71 may supply frequency division clock signal CLKM1 to input circuit 12-m'. Input circuit 12-m' may sample timing reference signal SSPH in synchronism with frequency division clock signal CLKM1 and may generate phase adjustment instruction signal SADJOUT for instructing an adjustment of a phase of slave side clock signal CLKSOUT. Phase adjustment instruction signal SADJOUT may be transmitted to slave side output clock generator circuit 32 through register I/O circuit 14, register I/O bus 53, and register I/O circuit 35. In this way, slave side output clock generator circuit 32 may adjust a phase of slave side clock signal CLKSOUT based upon phase adjustment instruction signal SADJOUT.

In the embodiment illustrated in FIG. 13, transmission of data (D1M to DmM) from master device 310 to slave device 330 and an adjustment of a phase of slave side clock signal CLKSIN may be executed in separate operations.

When transmission data (D1M to DmM) is transmitted from master device 310 to slave device 330, output circuits (15-2 to 15-m) may sample transmission data (D2M to DmM) in synchronism with master side clock signal CLKM to generate data signals (MD2 to MDm). Data switching circuit 72 may selectively output transmission data D1M to output circuit 15-1' and clock switching circuit 73 may selectively output master side clock signal CLKM to output circuit 15-1'. Thus, output circuit 15-1' may sample data D1M in synchronism with master side clock signal CLKM to generate data signal MD1. In this way, data signal (MD1 to MDm) may be transmitted from master device 310 to slave device 330. Clock switching circuit 82 included in slave device 330 may selectively output slave side clock signal CLKSIN to input circuit 37-1'. In this way, input circuits (37-1' to 37-m) may sample data signals (MD1 to MDm) in synchronism with slave side clock signal CLKSIN to receive transmission data (D1M to DmM) from master device 310.

However, when a phase of clock signal CLKSIN is adjusted, in master device 310, data switching circuit 72 may selectively output phase adjusting data DMPH to output circuit 15-1'. Clock switching circuit 73 may selectively output delay clock signal CLKM2 to output circuit 15-1'. Output circuit 15-1' may sample phase adjusting data DMPH in synchronism with delay clock signal CLKM2 to generate timing reference signal SMPH. In this way, timing reference signal SMPH may be transmitted to input circuit 37-1' of slave device 330. In slave device, clock switching circuit 82 may selectively output frequency division clock signal CLKSIN1 to input circuit 37-1'. Input circuit 37-1' may sample timing reference signal SMPH in synchronism with frequency division clock signal CLKSIN1 to generate phase adjustment instruction signal SADJIN. Phase adjustment instruction signal SADJIN may provide an instruction for adjusting a phase of slave side clock signal CLKSIN. Phase adjustment instruction signal SADJIN may be received by slave input clock generator circuit 36. Slave side input clock generator circuit 36 may adjust a phase of slave side clock signal CLKSIN in response to a value of phase adjustment instruction signal SADJIN.

In a data transmission system as illustrated in FIG. 13, a dedicated bus (such as bus 55 in FIG. 4) may not be needed for transmitting timing reference signals (SSPH and SMPH). Also, input circuits and output circuits may be used for both the generation and receiving of timing reference signals (SSPH and SMPH) and data signals (SDm and MD1). In this way, the number of bus lines between master device 310 and slave device 330 may be reduced, the number of input circuits and output circuits may be reduced, and the number of input pins and output pins on master device 310 and slave device 330 may be reduced.

In accordance with the embodiments, a data transmission system for transferring data between a master device and a slave device in which margins for data setup time and/or hold time may be improved has been disclosed.

Also, a data transmission system for transferring data between a master device and a slave device in which margins for data setup time and/or hold time may not be reduced due to variations of circuit operating characteristics has been disclosed.

Further, a data transmission system for transferring data between a master device and a slave device in which margins for data setup time and/or hold time may not be reduced due to variations of operating conditions has been disclosed.

It is understood that the embodiments described above are exemplary and the present invention should not be limited to those embodiments. Specific structures should not be limited to the described embodiments.

Thus, while the various particular embodiments set forth herein have been described in detail, the present invention could be subject to various changes, substitutions, and alterations without departing from the spirit and scope of the invention. Accordingly, the present invention is intended to be limited only as defined by the appended claims.

What is claimed is:

1. A data transmission system, comprising:
a master device including
a master side clock signal generation section coupled to generate a master side clock signal;
a phase shift circuit coupled to receive the master side clock signal and provide a shifted master side clock signal;
a clock signal switching circuit coupled to select the shifted master side clock signal or the master side clock signal for outputting as a select clock signal;
a data switching circuit coupled to select a transmission data or phase adjusting data for outputting as select data; and
a master side output section coupled to output a master side output signal, based on the select data, in response to the master side clock signal;
a slave device including
a slave side clock signal generator section coupled to generate a slave side clock signal;
a slave side input section coupled to sample the master side output signal, transmitted through a bus line, in response to the slave side clock signal; and
a phase adjusting circuit coupled to control a phase of the slave side clock signal wherein when the phase adjusting data is selected as the select data, the shifted clock signal is selected as the select clock signal and the slave side input section is coupled to generate a phase adjustment instruction signal based upon the master side output signal and the slave side clock signal, and
the phase adjusting circuit adjusts the phase of the slave side clock signal in response to the phase adjustment instruction signal.

2. The data transmission system according to claim 1, wherein:
a clock bus is coupled to supply a clock signal to the slave side clock signal generator section and the master side clock signal generator.

3. A data transmission system, comprising:
a slave device including
a slave side clock signal generator section coupled to generate a slave side clock signal;
a phase adjusting circuit coupled to control a phase of the slave side clock signal;
a data switching circuit coupled to select transmission data or phase adjusting data for outputting as select data; and
a slave output section coupled to receive the select data and output a transmission data signal to a first bus line in response to the slave side clock signal;
a master device including
a master side clock signal generation section coupled to generate a master side clock signal;
a phase shift circuit coupled to receive the master side clock signal and provide a shifted master side clock signal;
a clock signal switching circuit coupled to select the shifted master side clock signal or the master side clock signal for outputting as a select clock signal; and
a master input section coupled to sample the transmission data signal transmitted through the first bus line in response to the select clock signal;
wherein when the phase adjusting data is selected as the select data, the shifted master side clock signal is selected as the select clock signal and the master input section outputs a phase adjustment instruction signal based upon the select clock signal and the transmission data signal and the phase adjusting circuit adjusts the phase of the slave side clock signal based upon the phase adjustment instruction signal coupled to be transmitted through a second bus.

4. The data transmission system according to claim 3, wherein:
a clock bus is coupled to supply a clock signal to the slave side clock signal generator section and the master side clock signal generator.

5. The data transmission system according to claim 3, further including:
a plurality of slave devices, each slave device including a slave side clock signal generator section coupled to generate a slave side clock signal;

a phase adjusting circuit coupled to control a phase of the slave side clock signal;

a data switching circuit coupled to select the transmission data or phase adjusting data for outputting as select data; and a slave output section coupled to receive the select data and output a transmission data signal to the first bus line in response to the slave side clock signal;

wherein when the phase adjusting data is selected as the select data, the shifted master side clock signal is selected as the select clock signal and the master input section outputs a phase adjustment instruction signal based upon the select clock signal and the transmission data signal and the phase adjusting circuit of at least one of the plurality of slave devices adjusts the phase of the slave side clock signal of the at least one of the plurality of slave devices based upon the phase adjustment instruction signal coupled to be transmitted through the second bus.

* * * * *